US008538686B2

(12) United States Patent
Gruen et al.

(10) Patent No.: US 8,538,686 B2
(45) Date of Patent: Sep. 17, 2013

(54) TRANSPORT-DEPENDENT PREDICTION OF DESTINATIONS

(75) Inventors: Robert W. Gruen, Seattle, WA (US); John C. Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/228,460

(22) Filed: Sep. 9, 2011

(65) Prior Publication Data

US 2013/0066548 A1 Mar. 14, 2013

(51) Int. Cl.
*G01C 21/30* (2006.01)

(52) U.S. Cl.
USPC ........... 701/426; 701/467; 701/468; 701/533; 222/541.7; 222/523; 222/457; 340/990; 340/994; 340/995.24; 342/463; 342/464; 342/457; 190/102; 190/108; 235/375; 235/384

(58) Field of Classification Search
USPC .. 701/208, 426, 467, 468, 533; 222/153.145, 222/457, 523, 541.7; 340/990, 994, 995.24; 342/463, 464, 457; 190/102, 108; 235/375, 235/384; 705/5
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,623,194 A | 4/1997 | Boll et al. | |
| 5,812,865 A | 9/1998 | Theimer et al. | |
| 5,845,227 A | 12/1998 | Peterson | |
| 5,861,827 A * | 1/1999 | Welch et al. | 341/51 |
| 5,948,040 A | 9/1999 | DeLorme et al. | |
| 5,978,732 A | 11/1999 | Kakitani et al. | |
| 6,084,543 A | 7/2000 | Iizuka | |
| 6,092,014 A | 7/2000 | Okada | |

(Continued)

FOREIGN PATENT DOCUMENTS

| | | |
|---|---|---|
| DE | 10042983 | 3/2002 |
| EP | 1085484 A2 | 3/2001 |

(Continued)

OTHER PUBLICATIONS

Krumm, John, "Real Time Destination Prediction Based on Efficient Routes," retrieved at <<http://research.microsoft.com/en-us/um/people/jckrumm/Publications%202006/efficient%20routes%20camera%20ready.pdf>>, Society of Automotive Engineers (SAE) 2006 World Congress, Apr. 2006, Paper 2006-01-0811, Apr. 2006, 6 pages.

(Continued)

*Primary Examiner* — McDieunel Marc

(57) ABSTRACT

A destination analysis module is described which estimates at least one destination of a user given a partial path taken by the user within a geographic area. The destination analysis module operates by detecting a mode of transportation that a user uses to traverse the path (e.g., automobile, public transportation, walking, etc.). The destination analysis module then loads a model associated with the mode of transportation into a destination prediction module and estimates at least one destination based on the path and the model. The model has various components that depend on the mode of transportation, such as routing network information and prior probability information.

20 Claims, 9 Drawing Sheets

(56) References Cited

U.S. PATENT DOCUMENTS

| | | | |
|---|---|---|---|
| 6,098,015 A | 8/2000 | Nimura et al. | |
| 6,116,363 A | 9/2000 | Frank | |
| 6,121,901 A * | 9/2000 | Welch et al. | 341/51 |
| 6,122,572 A | 9/2000 | Yavnai | |
| 6,154,745 A | 11/2000 | Kari et al. | |
| 6,157,853 A * | 12/2000 | Blume et al. | 600/426 |
| 6,292,687 B1 | 9/2001 | Lowell et al. | |
| 6,314,347 B1 | 11/2001 | Kuroda et al. | |
| 6,317,718 B1 | 11/2001 | Fano | |
| 6,321,161 B1 | 11/2001 | Herbst et al. | |
| 6,353,398 B1 | 3/2002 | Amin et al. | |
| 6,381,522 B1 | 4/2002 | Watanabe et al. | |
| 6,418,424 B1 | 7/2002 | Hoffberg et al. | |
| 6,466,232 B1 | 10/2002 | Newell et al. | |
| 6,480,783 B1 | 11/2002 | Myr | |
| 6,490,519 B1 | 12/2002 | Lapidot et al. | |
| 6,513,046 B1 | 1/2003 | Abbott, III et al. | |
| 6,549,915 B2 | 4/2003 | Abbott, III et al. | |
| 6,574,351 B1 | 6/2003 | Miyano | |
| 6,611,754 B2 | 8/2003 | Klein | |
| 6,615,130 B2 | 9/2003 | Myr | |
| 6,618,593 B1 | 9/2003 | Drutman et al. | |
| 6,672,506 B2 | 1/2004 | Swartz et al. | |
| 6,700,504 B1 | 3/2004 | Aslandogan et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,807,483 B1 | 10/2004 | Chao et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| RE38,724 E | 4/2005 | Peterson | |
| 6,889,382 B1 | 5/2005 | Anderson | |
| 6,931,598 B2 | 8/2005 | Price et al. | |
| 6,954,735 B1 | 10/2005 | Djupsjobacka et al. | |
| 7,010,501 B1 | 3/2006 | Roslak et al. | |
| 7,040,541 B2 | 5/2006 | Swartz et al. | |
| 7,054,938 B2 | 5/2006 | Sundqvist et al. | |
| 7,063,263 B2 | 6/2006 | Swartz et al. | |
| 7,069,310 B1 | 6/2006 | Bartholomew | |
| 7,071,842 B1 | 7/2006 | Brady, Jr. | |
| 7,130,743 B2 * | 10/2006 | Kudo et al. | 701/424 |
| 7,171,378 B2 | 1/2007 | Petrovich et al. | |
| 7,195,157 B2 | 3/2007 | Swartz et al. | |
| 7,200,394 B2 | 4/2007 | Aoki et al. | |
| 7,200,566 B1 | 4/2007 | Moore et al. | |
| 7,227,498 B2 | 6/2007 | Soliman | |
| 7,233,861 B2 * | 6/2007 | Van Buer et al. | 701/424 |
| 7,245,925 B2 | 7/2007 | Zellner | |
| 7,385,501 B2 | 6/2008 | Miller et al. | |
| 7,386,477 B2 | 6/2008 | Fano | |
| 7,403,774 B2 | 7/2008 | Chandra et al. | |
| 7,463,890 B2 | 12/2008 | Herz et al. | |
| 7,512,462 B2 | 3/2009 | Nichols et al. | |
| 7,536,258 B2 * | 5/2009 | Kudo et al. | 701/424 |
| 7,577,522 B2 | 8/2009 | Rosenberg | |
| 7,589,628 B1 | 9/2009 | Brady, Jr. | |
| 7,590,589 B2 | 9/2009 | Hoffberg | |
| 7,596,513 B2 | 9/2009 | Fargo | |
| 7,610,151 B2 | 10/2009 | Letchner et al. | |
| 7,617,042 B2 | 11/2009 | Horvitz et al. | |
| 7,630,986 B1 | 12/2009 | Herz et al. | |
| 7,676,583 B2 | 3/2010 | Eaton et al. | |
| 7,698,055 B2 | 4/2010 | Horvitz et al. | |
| 7,706,964 B2 | 4/2010 | Horvitz et al. | |
| 7,720,715 B1 | 5/2010 | Nemer | |
| 7,739,040 B2 | 6/2010 | Horvitz | |
| 7,792,637 B2 * | 9/2010 | Matsuura et al. | 701/408 |
| 7,797,267 B2 | 9/2010 | Horvitz | |
| 7,813,870 B2 | 10/2010 | Downs et al. | |
| 7,899,611 B2 | 3/2011 | Downs et al. | |
| 7,912,628 B2 | 3/2011 | Chapman et al. | |
| 7,912,637 B2 | 3/2011 | Horvitz et al. | |
| 7,925,425 B2 | 4/2011 | Tomita et al. | |
| 7,925,426 B2 | 4/2011 | Koebler et al. | |
| 8,020,104 B2 | 9/2011 | Robarts et al. | |
| 8,024,112 B2 * | 9/2011 | Krumm et al. | 701/423 |
| 8,090,530 B2 | 1/2012 | Horvitz | |
| 8,126,641 B2 | 2/2012 | Horvitz | |
| 8,141,000 B2 * | 3/2012 | Hirosawa | 715/829 |
| 8,165,773 B1 | 4/2012 | Chavez et al. | |
| 8,190,362 B2 | 5/2012 | Barker et al. | |
| 2001/0029425 A1 | 10/2001 | Myr | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0002504 A1 | 1/2002 | Engel et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott, III et al. | |
| 2002/0052963 A1 | 5/2002 | Abbott, III et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0107618 A1 | 8/2002 | Deguchi et al. | |
| 2003/0042051 A1 | 3/2003 | Kriger | |
| 2003/0046401 A1 | 3/2003 | Abbott et al. | |
| 2003/0069083 A1 | 4/2003 | Lapidot et al. | |
| 2003/0135304 A1 | 7/2003 | Sroub et al. | |
| 2003/0139863 A1 | 7/2003 | Toda et al. | |
| 2003/0153338 A1 | 8/2003 | Herz et al. | |
| 2003/0154009 A1 | 8/2003 | Basir et al. | |
| 2003/0154476 A1 | 8/2003 | Abbott, III et al. | |
| 2003/0172368 A1 | 9/2003 | Alumbaugh et al. | |
| 2003/0229471 A1 | 12/2003 | Guralnik et al. | |
| 2003/0229895 A1 | 12/2003 | Jasinschi et al. | |
| 2004/0017392 A1 | 1/2004 | Welch | |
| 2004/0019603 A1 | 1/2004 | Haigh et al. | |
| 2004/0068364 A1 | 4/2004 | Zhao et al. | |
| 2004/0090121 A1 | 5/2004 | Simonds et al. | |
| 2004/0090346 A1 | 5/2004 | Simonds et al. | |
| 2004/0092253 A1 | 5/2004 | Simonds et al. | |
| 2004/0093154 A1 | 5/2004 | Simonds et al. | |
| 2004/0093155 A1 | 5/2004 | Simonds et al. | |
| 2004/0125144 A1 | 7/2004 | Yoon | |
| 2004/0128066 A1 * | 7/2004 | Kudo et al. | 701/204 |
| 2004/0153445 A1 | 8/2004 | Horvitz et al. | |
| 2004/0176211 A1 | 9/2004 | Kitajima et al. | |
| 2004/0189475 A1 | 9/2004 | Cooper et al. | |
| 2004/0201500 A1 | 10/2004 | Miller et al. | |
| 2004/0249568 A1 | 12/2004 | Endo et al. | |
| 2004/0267965 A1 | 12/2004 | Vasudevan et al. | |
| 2004/0268403 A1 | 12/2004 | Krieger et al. | |
| 2005/0021417 A1 | 1/2005 | Kassan | |
| 2005/0034078 A1 | 2/2005 | Abbott et al. | |
| 2005/0046584 A1 | 3/2005 | Breed | |
| 2005/0049900 A1 | 3/2005 | Hirose et al. | |
| 2005/0091118 A1 | 4/2005 | Fano | |
| 2005/0097005 A1 | 5/2005 | Fargo | |
| 2005/0125148 A1 | 6/2005 | Van Buer et al. | |
| 2005/0131607 A1 | 6/2005 | Breed | |
| 2005/0144318 A1 | 6/2005 | Chang | |
| 2005/0149253 A1 | 7/2005 | Nambata | |
| 2005/0182645 A1 | 8/2005 | Ehlis et al. | |
| 2005/0216186 A1 | 9/2005 | Dorfman et al. | |
| 2005/0219120 A1 | 10/2005 | Chang | |
| 2005/0228553 A1 | 10/2005 | Tryon | |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0070012 A1 | 3/2006 | Milener et al. | |
| 2006/0138219 A1 | 6/2006 | Brzezniak et al. | |
| 2006/0195789 A1 | 8/2006 | Rogers et al. | |

| | | | |
|---|---|---|---|
| 2006/0241862 A1 | 10/2006 | Ichihara et al. | |
| 2006/0271286 A1 | 11/2006 | Rosenberg | |
| 2006/0286988 A1 | 12/2006 | Blume et al. | |
| 2007/0008927 A1 | 1/2007 | Herz et al. | |
| 2007/0033516 A1 | 2/2007 | Khosla et al. | |
| 2007/0060108 A1 | 3/2007 | East et al. | |
| 2007/0073477 A1 | 3/2007 | Krumm et al. | |
| 2007/0083497 A1 | 4/2007 | Martinez | |
| 2007/0106465 A1 | 5/2007 | Adam et al. | |
| 2007/0118279 A1 | 5/2007 | Kudo | |
| 2007/0129072 A1 | 6/2007 | Yamato et al. | |
| 2007/0156334 A1 | 7/2007 | Vu | |
| 2007/0208991 A1 | 9/2007 | Rider | |
| 2008/0004802 A1 | 1/2008 | Horvitz | |
| 2008/0005055 A1 | 1/2008 | Horvitz | |
| 2008/0088424 A1 | 4/2008 | Imura et al. | |
| 2008/0090591 A1 | 4/2008 | Miller et al. | |
| 2008/0091537 A1 | 4/2008 | Miller et al. | |
| 2008/0126191 A1 | 5/2008 | Schiavi | |
| 2008/0140712 A1 | 6/2008 | Weber et al. | |
| 2008/0161018 A1 | 7/2008 | Miller et al. | |
| 2008/0247377 A1 | 10/2008 | Van Horn et al. | |
| 2008/0249667 A1 | 10/2008 | Horvitz et al. | |
| 2008/0261516 A1 | 10/2008 | Robinson | |
| 2008/0263036 A1 | 10/2008 | Yamamoto | |
| 2008/0288494 A1 | 11/2008 | Brogger et al. | |
| 2008/0319658 A1 | 12/2008 | Horvitz et al. | |
| 2008/0319660 A1 | 12/2008 | Horvitz et al. | |
| 2009/0005067 A1 | 1/2009 | Ernst et al. | |
| 2009/0006297 A1 | 1/2009 | Horvitz et al. | |
| 2009/0036148 A1 | 2/2009 | Yach | |
| 2009/0037838 A1 | 2/2009 | Gedye et al. | |
| 2009/0174540 A1 | 7/2009 | Smith | |
| 2009/0319672 A1 | 12/2009 | Reisman | |
| 2010/0010733 A1 | 1/2010 | Krumm | |
| 2010/0036601 A1 | 2/2010 | Ozawa et al. | |
| 2010/0070171 A1 | 3/2010 | Barbeau et al. | |
| 2010/0106603 A1* | 4/2010 | Dey et al. | 705/14.63 |
| 2010/0153007 A1 | 6/2010 | Crowley | |
| 2010/0185388 A1 | 7/2010 | Horvitz | |
| 2010/0185486 A1* | 7/2010 | Barker et al. | 705/10 |
| 2010/0188575 A1 | 7/2010 | Salomons et al. | |
| 2010/0198860 A1 | 8/2010 | Burnett et al. | |
| 2010/0299177 A1* | 11/2010 | Buczkowski et al. | 705/9 |
| 2010/0332315 A1 | 12/2010 | Kamar et al. | |
| 2010/0333137 A1 | 12/2010 | Hamano et al. | |
| 2011/0004513 A1 | 1/2011 | Hoffberg | |
| 2011/0085447 A1 | 4/2011 | Kholaif et al. | |
| 2011/0238289 A1 | 9/2011 | Lehmann et al. | |
| 2011/0246059 A1 | 10/2011 | Tokashiki | |
| 2011/0282571 A1 | 11/2011 | Krumm et al. | |
| 2012/0089322 A1 | 4/2012 | Horvitz | |

FOREIGN PATENT DOCUMENTS

| | | |
|---|---|---|
| EP | 1929456 A1 | 6/2008 |
| GB | 2431261 A | 4/2007 |
| JP | 2007083678 | 3/1995 |
| JP | 2008271277 | 10/1996 |
| JP | 10132593 | 5/1998 |
| JP | 2011153446 | 6/1999 |
| JP | 2002328035 | 11/2002 |
| JP | 2004317160 | 11/2004 |
| KR | 19970071404 | 11/1997 |
| KR | 1020040033141 | 4/2004 |
| KR | 1020040050550 | 6/2004 |
| KR | 1020050035336 | 4/2005 |
| KR | 1020050045716 | 5/2005 |
| KR | 1020040078955 | 9/2005 |
| KR | 1020050105139 | 11/2005 |
| SU | 8141 | 10/1998 |
| WO | 9800787 | 1/1998 |
| WO | 2004044605 A2 | 5/2004 |
| WO | 2007040891 A1 | 4/2007 |

OTHER PUBLICATIONS

Krumm, et al., "Predestination: Inferring Destinations from Partial Trajectories," retrieved at http://research.microsoft.com/en-us/um/people/horvitz/predestination.pdf>>, Eighth International Conference on Ubiquitous Computing (UbiComp 2006), Sep. 2006, 18 pages.

Tanaka, et al., "A Destination Prediction Method Using Driving Contexts and Trajectory for Car Navigation Systems," retrieved at <<http://acm.org>>, Proceedings of the 2009 ACM Symposium on Applied Computing, 2009, pp. 190-195.

Liu, et al., "Location awareness through trajectory prediction," retrieved at <<http://www.sis.pitt.edu/~xliu/papers/ceus.pdf>>, Computers, Environment and Urban Systems, vol. 30, 2006, pp. 741-756.

Console, et al., "Adaptation and Personalization on Board Cars: A Framework and Its Application to Tourist Services," retrieved at <<http://w5.cs.uni-sb.de/~dominik/um/papers/2-adaptive-webdienste/console2002-Personalization-on-Cars.pdf>>, AH 2002, Proceedings of the Second International Conference on Adaptive Hypermedia and Adaptive Web-Based Systems, LNCS 2347, Springer-Verlag, 2002, pp. 112-121.

Van Setten, et al., "Context-Aware Recommendations in the Mobile Tourist Application COMPASS," retrieved at <<https://doc.telin.nl/dsweb/Get/Document-40585/settenah2004.pdf>>, AH 2004, Proceedings of the Second International Conference on Adaptive Hypermedia and Adaptive Web-Based Systems, LNCS 3137, Springer-Verlag, 2004, 10 pages.

Krumm, et al., "Where will they turn: predicting turn proportions at intersections," retrieved at <<http://acm.org>>, Personal and Ubiquitous Computing, vol. 14, Issue 7, Oct. 2010, pp. 591-599.

Froehlich, et al., "Route Prediction from Trip Observations," retrieved at <<http://citeseerx.ist.psu.edu/viewdoc/download?doi=10.1.1.130.5251&rep=rep1&type=pdf>>, Society of Automotive Engineers (SAE) 2008 World Congress, 2008, 13 pages.

Krumm, et al, "Trajectory Analysis for Driving," retrieved at <<http://www.springerlink.com/content/978-1-4614-1628-9/front-matter.pdf>>, in Computing with Spatial Trajectories, 2011, pp. 213-241.

Krumm, et la., "Map Matching with Travel Time Constraints," retrieved at <<http://research.microsoft.com/en-us/um/people/jckrumm/Publications%202007/map%20matching%20HMM%2001%20web.pdf>>, Society of Automotive Engineers (SAE) 2007 World Congress, Paper No. 2007-01-1102, 2007, 11 pages.

Patterson, et al., "Inferring High-Level Behavior from Low-Level Sensors," retrieved at <<http://www.cs.rochester.edu/~kautz/papers/High-Level-140.pdf>>, UbiComp 2003, Proceedings of the International Conference on Ubiquitous Computing, 2004, 18 pages.

Brilingaite, et al., "Online Route Prediction for Automotive Applications," retrieved at <<http://citeseerx.ist.psu.edu/viewdoc/download?doi=10.1.1.72.2331&rep=rep1&type=pdf>>, Proceedings of the Thirteenth World Congress and Exhibition on Intelligent Transport Systems and Services, 2006, 8 pages.

Simmons, et al., "Learning to Predict Driver Route and Destination Intent," retrieved at <<http://www.cs.cmu.edu/~brettb/papers/06itsc-driver-intent.pdf>>, Proceedings of the 9th International IEEE Conference on Intelligent Transportation Systems, 2006, 6 pages.

Torkkola, et al., "Traffic Advisories Based on Route Prediction," retrieved at <<http://www.medien.ifi.lmu.de/mirw2007/papers/MIRW2007_Torkkola.pdf>>, Proceedings of Workshop on Mobile Interaction with the Real World, 2007, 4 pages.

Lasssonen, Kari, "Route Prediction from Cellular Data," retrieved at <<http://www.cs.helsinki.fi/group/context/pubs/caps05.pdf>>, Workshop on Context-Awareness for Proactive Systems, 2005, 10 pages.

Lamb, et al., "Avoiding Explicit Map-Matching in Vehicle Location," retrieved at <<http://safari.ce.sharif.edu/file/2011-06-06/248/1999_Avoiding%20Explicit%20Map-Matching%20in%20Vehicle%20Location.pdf>>, 6th ITS World Congress (ITS-99), Nov. 1999, 9 pages.

Krumm, et al., "Predestination: Where Do You Want to Go Today?," retrieved at <<http://research.microsoft.com/en-us/um/people/horvitz/predestination-ieee.pdf>>, Computer, vol. 40, Issue, 2007, pp. 105-107.

Vaughan-Nichols, S. J., "Will Mobile Computing's Future Be Location, Location, Location?," retrieved at <<http://crystal.uta.edu/~kumar/CSE4340_5349MSE/Will%20Mobile%20Computing.pdf>>, Computer, vol. 42, Issue, 2009, pp. 14-17.

Terada, et al., "Design of a Car Navigation System that Predicts User Destination," retrieved at <<http://IEEE.org>>, MDM '06, Proceedings of the 7th International Conference on Mobile Data Management, 2006, 6 pages.

Karbassi, et al., "Vehicle Route Prediction and Time of Arrival Estimation Techniques for Improved Transportation System Management," Proceedings of the IEEE Intelligent Vehicles Symposium, 2003, pp. 511-516.

Miyashita, et al., "A Map Matching Algorithm for Car Navigation Systems that Predict User Destination," retrieved at <<http://IEEE.org>>, AINAW 2008, 22nd Internal Conference on Advanced Information Networking and Applications, 2008, pp. 1551-1556.

Liu, et al., "Remaining Delivery Time Estimation Based Routing for Intermittently Connected Mobile Networks," retrieved at <<http://IEEE.org>>, 28th International Conference on Distributed Computing Systems Workshops, 2008, pp. 222-227.

Wu, et la., "A Dynamic Navigation Scheme for Vehicular ad hoc Networks," retrieved at <<http://IEEE.org>>, 2010 Sixth International Conference on Networked Computing and Advanced Information Management (NCM), 2010, pp. 231-235.

Wei, et la., "Development of Freeway Travel Time Forecasting Models by Integrating Different Sources of Traffic Data," retrieved at <<http://IEEE.org>>, IEEE Transactions on Vehicular Technology, vol. 56, No. 6, 2007, pp. 3682-3694.

Delling, et al., "PHAST: Hardware-Accelerated Shortest Path Trees," retrieved at <<http://research.microsoft.com/pubs/138638/phasttr.pdf>>, Microsoft Research Technical Report No. MSR-TR-2010-125, Microsoft Research, Redmond, WA, Sep. 2010, 20 pages.

Xie, et al., "Development of Navigation System for Autonomous Vehicle to Meet the DARPA Urban Grand Challenge," retrieved at <<http://IEEE.org>>, ITSC 2007, Proceedings of the 2007 IEEE Intelligent Transportation Systems Conference, 2007, pp. 767-772.

Choi, et al, "Performance Evaluation of Traffic Control Based on Geographical Information," retrieved at <<http://IEEE.org>>, ICIS 2009, IEEE International Conference on Intelligent Computing and Intelligent Systems, vol. 3, 2009, pp. 85-89.

Lee, et al., "Design and Implementation of a Movement History Analysis Framework for the Taxi Telematics System," retrieved at <<http://IEEE.org>>, APCC 2008, 14th Proceedings of the Asia-Pacific Conference on Communications, 2008, 4 pages.

Sananmongkhoncha, et al., "Cell-based Traffic Estimation from Multiple GPS-equipped Cars," retrieved at <<http://safari.ce.sharif.edu/file/2011-05-28/228/05395897-Cell-based%20Traffic%20Estimation%20from%20Multiple%20GPS-Equipped%20Cars.pdf>>, IEEE Region 10 Conference, 2009, 6 pages.

Kostov, et al., "Travel Destination Prediction Using Frequent Crossing Pattern from Driving History," retrieved at <<http://IEEE.org>>, Proceedings of the 8th International IEEE Conference on Intelligent Transportation Systems, 2005, pp. 343-350.

Beard, et al., "Estimating Positions and Paths of Moving Objects," retrieved at <<http://IEEE.org>>, Proceedings of the Seventh International Workshop on Temporal Representation and Reasoning, 2000, 8 pages.

Ye, et al., "Predict Personal Continuous Route," retrieved at <<http://IEEE.org>>, ITSC 2008, Proceedings of the 11th International IEEE Conference on Intelligent Transportation Systems, 2008, pp. 587-592.

International Search Report for PCT Application No. PCT/US2008/67808, mailed on Dec. 12, 2008, 4 pages.

International Search Report for PCT Application No. PCT/US2006/034608, mailed on Jan. 15, 2007, 2 pages.

Harter, et al., "A Distributed Location System for the Active Office," retrieved at <<http://www.cs.cmu.edu/~motionplanning/papers/sbp_papers/integrated2/harter_dist_loc.pdf>>, IEEE Network, vol. 8, No. 1, 1993, 17 pages.

Chen, et al., "A Survey of Context-Aware Mobile Computing Research," retrieved at <<http://www.cs.dartmouth.edu/reports/TR2000-381.pdf>>, Dartmouth Computer Science Technical Report, Report No. TR2000-381, Dartmouth College, Hanover, New Hampshire, 2000, 16 pages.

Schilt, et al., "A System Architecture for Context-Aware Mobile Computing,", retrieved at <<http://systems.cs.colorado.edu/~grunwald/MobileComputing/Papers/system-arch-for-context-aware-mobile-apps.pdf>>, PhD Thesis, Columbia University, New York City, 1995, 153 pages.

Spreitzer, et al., "Providing Location Information in a Ubiquitous Computing Environment," retrieved at <<http://acm.org>>, Proceedings of the Fourteenth ACM Symposium on Operating Systems Principles, 1993, pp. 270-283.

Theimer, et al., "Operating System Issues for PDAs," retrieved at <<http://IEEE.org>>, Fourth Workshop on Workstation Operating Systems, 1993, pp. 2-8.

Want, Roy, "Active Badges and Personal Interactive Computing Objects," retrieved at <<http://IEEE.org>>, IEEE Transactions on Consumer Electronics, vol. 38, No. 1, 1992, pp. 10-20.

Schilit, et al., "The ParcTab Mobile Computing System," retrieved at <<http://citeseerx.ist.psu.edu/viewdoc/download?doi=10.1.1.43.9880&rep=rep1&type=pdf>>, Fourth Workshop on Workstation Operating Systems, 1993, 4 pages.

Schilit, et al., "Context-Aware Computing Applications," retrieved at <<http://www.ubiq.com/want/papers/parctab-wmc-dec94.pdf>>, IEEE Workshop on Mobile Computing Systems and Applications, Dec. 1994, 7 pages.

"Changes to Lists on Spaces with the last release," retrieved at <<https://hackmsnspaces.wordpress.com/2007/06/18/changes-to-lists-on-spaces-with-the-last-release/>>, Hack MSN Spaces, posted Jun. 18, 2007, 5 pages.

"Configuring Multiple SSIDs," retrieved at <<http://www.cisco.com/en/US/docs/wireless/access_point/12.3_7_JA/configuration/guide/s37ssid.html, retrieved on Jul. 11, 2012, Cisco Systems, Inc., San Jose, CA, 6 pages.

Falaki, Mohammad Hossein, "WLAN Interface Management on Mobile Devices," retrieved at <<http://uwspace.uwaterloo.ca/bitstream/10012/3854/1/uw-ethesis.pdf>>, masters thesis, University of Waterloo, Canada, 2008, 88 pages.

Horvitz, et al., "Attention-Sensitive Alerting," retrieved at <<http://research.microsot.com/en-us/um/people/horvitz/priorities.pdf>>, Proceedings of UAI '99, Conference on Uncertainty and Artificial Intelligence, 1999, 10 pages.

Krumm, et al., "Predestination: Inferring Destinations from Partial Trajectories," retrieved at <<http://research.microsoft.com/en-us/um/people/horvitz/predestination.pdf>>, UbiComp'06, Proceedings of the 8th International Conference on Ubiquitous Computing, Sep. 2006, 18 pages.

Orebaugh, et al., "Wireless Sniffing with Wireshark," retrieved at <<http://www.willhackforsushi.com/books/377_eth_2e_06.pdf>>, Wireshark & Ethereal Network Protocol Analyzer Toolkit, Chapter 6, Sep. 2006, pp. 6:1-6:104.

"Smart WiFi for Android ™," retrieved at <<http://www.s4bb.com/software/smartwifi/smartwifi-for-android/>>, S4BB Limited, Mobile Software Experts, retrieved on Jul. 12, 2012, 5 pages.

Benzoon, "SmartWiFi for BlackBerry: A Battery Power Optimizer," retrieved at <<http://www.blackberryinsight.com/2011/06/03/smartwifi-for-blackberry-a-battery-power-optimizer/>>, BlackBerry Insight, Jun. 3, 2011, 11 pages.

Starner, Thad, "Wearable Computing and Contextual Awareness," PhD thesis, Massachusetts Institute of Technology, 1999, title page and abstract, 3 pages.

Schilit, et al., "Customizing Mobile Applications," retrieved at <<http://citeseerx.ist.psu.edu/viewdoc/summary? doi=10.1.1.56.6198>>, Mobile & Location-Independent Computing Symposium on Mobile & Location-Independent Computing Symposium, Aug. 1993, 9 pages.

Spreitzer, et al., "Architectural Considerations for Scalable, Secure, Mobile Computing with Location Information," retrieved at <<http://IEEE.org>>, The 14th International Conference on Distributed Computing Systems, Jun. 1994, pp. 29-38.

Spreitzer, et al., "Scalable, Secure, Mobile Computing with Location Information," retrieved at <<http://acm.org>>, Communications of the ACM, vol. 36, No. 7, Jul. 1993, p. 27.

Want, et al., "The Active Badge Location System," retrieved at <<http://acm.org>>, ACM Transactions on Information Systems, vol. 10, No. 1, Jan. 1992, pp. 91-102.

Billinghurst, et al., "An Evaluation of Wearable Information Spaces," retrieved at <<http://www.hitl.washington.edu/publications/r-97-35/r-97-35.pdf>>, Proceedings of the Virtual Reality Annual International Symposium, 1998, 8 pages.

Rhodes, et al., "Remembrance Agent: A Continuously Running Automated Information Retrieval System," retrieved at <<http://www.aaai.org/Papers/Symposia/Spring/1996/SS-96-02/SS96-02-022.pdf>>, AAAI Technical Report No. SS-96-02, 1996, pp. 122-125.

Horvitz, et al., "In Pursuit of Effective Handsfree Decision Support: Coupling Bayesian Inference," retrieved at <<http://citeseerx.ist.psu.edu/viewdoc/summary?doi=10.1.1.18.1469>>, Speech Understanding, and User Models, 1995, 8 pages.

Rhodes, et al., "The Wearable Remembrance Agent: A System for Augmented Memory," retrieved at <<http://alumni.media.mit.edu/~rhodes/Papers/wear-ra.html>>, Proceedings of the First International Symposium on Wearable Computers, Oct. 1997, pp. 123-128.

Horvitz, et al., "Attention-Sensitive Alerting" retrieved at <<http://research.microsoft.com/en-us/um/people/horvitz/priorities.pdf>>, Proceedings of UAI '99, Conference on Uncertainty and Artificial Intelligence, 1999, 10 pages.

Schilit, et al., "Disseminating Active Map Information to Mobile Hosts," retrieved at <<http://IEEE.org>>, IEEE Network, vol. 8, No. 5, 1994, pp. 22-32.

Billinghurst, et al., "Wearable Devices: New Ways to Manage Information," retrieved at <<http://www.cc.gatech.edu/~thad/p/magazine/published-1999-32-1.pdf>>, IEEE Computer Society, Jan. 1999, pp. 57-64.

Persad-Maharaj, et al., "Real-time Travel Path Prediction Using GPS-enabled Mobile Phones," retrieved at <<http://citeseerx.ist.psu.edu/viewdoc/summary?doi=10.1.1.149.8272>>, Presented at the 15th World Congress on Intelligent Transportation Systems, Paper # 30413, Nov. 2008, 12 pages.

Rhodes, Bradley J., "The Wearable Remembrance Agent: A System for Augmented Memory," retrieved at <<http://alumni.media.mit.edu/~rhodes/Papers/wear-ra-personaltech/index.html>>, Personal Technologies Journal Special Issue on Wearable Computing, 1997, 10 pages.

"Boeing Wearable Computer Workshop Breakout Session Summary," accessed at <<http://www.cs.cmu.edu/~wearable/boeing/index.html>>, accessed on Feb. 1, 2012, Boeing Workshop on Wearable Computing Systems, Aug. 19-21, 1996, 3 pages.

Billinghurst, Mark, "Research Directions in Wearable Computing," retrieved at <<http://subversion.assembla.com/svn/matchmaker/documenten/Literatuur/cognitive%20overload%20enzo.pdf>>, slide presentation, presented at EPSRC Visualization and Virtual Environments Community Club (VVECC), Apr. 2000, 10 pages.

Weiser, Mark, "The Computer for the 21st Century," retrieved at <<http://acm.org>>, ACM SIGMOBILE Mobile Computing and Communications Review, vol. 3, Issue 3, Jul. 1999, pp. 3-11.

Joachims, Thorsten, "Text Categorization with Support Vector Machines: Learning with Many Relevant Features," retrieved at <<http://www.cs.iastate.edu/~jtian/cs573/Papers/Joachims-ECML-98.pdf>>, European Conference on Machine Learning, Apr. 1998, pp. 137-142.

International Search Report for PCT Application No. Serial No. PCT/US2000/020685, mailed on Sep. 29, 2003, 5 pages.

Losee, Robert M. Jr., "Minimizing Information Overload: The Ranking of Electronic Messages," retrieved at <<http://www.ils.unc.edu/~losee/infoover.pdf>>, Journal of Information Science, Elsevier Science Publishers B.V., 1989, 17 pages.

U.S. Appl. No. 13/088,040, filed Apr. 15, 2011, Viola, et al., entitled, "Suggestive Mapping," 46 pages.

"About Project Playlist," retrieved at <<http://www.playlist.com/static/node/491.html>>, retrieved at on Feb. 1, 2012, Playlist.com, Beverley Hills, California, 2 pages.

Beigel, et al., "A Framework for Developing Mobile, Context-Aware Applications," retrieved at <<http://IEEE.org>>, Proceedings of the Second IEEE Annual Conference on Pervasive Computing and Communications, 2004, 5 pages.

Biskikian, et al., "Intelligent Pervasive Middleware for Context-Based and Localized Telematics Services," retrieved at <<http://acm.org>>, Proceedings of the 2nd International Workshop on Mobile Commerce, 2002, pp. 15-24.

U.S. Appl. No. 12/970,974, filed Dec. 17, 2010, Brush, et al., entitled, "Mobile Search Based on Predicted Location," 35 pages.

"Coactive TV," retrieved at <<http://teleshuttle.com/CoTV/>>, retrieved on Feb. 1, 2012, Teleshuttle Corporation, New York, New York, 2 pages.

"Take a Tour of Mapquest," retrieved at <<http://features.mapquest.com/>>, Mapquest.com Features, retrieved on Oct. 27, 2010, 3 pages.

Horvitz, et al., "Bayesphone: Context-Sensitive Policies for Inquiry and Action in Mobile Devices," retrieved at <<http://research.microsoft.com/en-us/um/people/horvitz/bayesphone.pdf>>, Proceedings of the Tenth Conference on User Modeling (UM 2005), Jul. 2005, 11 pages.

Horvtitz, et al., "Display of Information for Time-Critical Decision Making," retrieved at <<ftp://ftp.research.microsoft.com/pub/ejh/vista.pdf>>, Proceedings of the Eleventh Conference on Uncertainty in Artificial intelligence, Aug. 1995, 10 pages.

Horvtiz, et al., "Learning and Reasoning about Interruption," retrieved at <<http://research.microsoff.com/en-us/um/people/horvitz/iw.pdf>>, Fifth International Conference on Multimodal Interfaces, Nov. 2003, 8 pages.

Kargl, et al., "Smart Reminder-Personal Assistance in a Mobile Computing Environment," retrieved at <<http://cia.informatik.uni-ulm.de/forschung/publikationen/cscw2002.pdf>>, Pervasive 2002 conference, Zurich, Switzerland, Aug. 2002, 6 pages.

"Nagra's cross-device user experience wins 'Advanced User Interface' Award at TV 3.0 conference," retrieved at <<http://advanced-television.com/index.php/2010/12/21/nagrac0E2%80%99s-cross-device-user-experience-wins-E2%80%9Cadvanced-user-interface%E2%80%9D-award-at-tv-3-0-conference/>>, retrieved on Feb. 1, 2012, Dec. 21, 2010, Advanced Television, 4 pages.

Written Opinion for PCT Application No. PCT/US2007/014405, mailed on Dec. 11, 2007, 4 pages.

"Publicis & Yahoo Team for Cross-Carrier Marketing," retrieved at <<http://www.mobilemarketingwatch.com/tag/cross-device-marketing/>>, retrieved on Feb. 1, 2012, Mobile Marketing Watch, Jul. 18, 2008, 5 pages.

Bhawalkar, et al., "ScheduleNanny Using GPS to Learn the User's Significant Locations, Travel Times and Schedule," retrieved at <<http://arxiv.org/ftp/cs/papers/0409/0409003.pdf>>, In Proceedings of CoRR. 2004, 7 pages.

Horvitz, et al., "Mobile Opportunistic Planning: Methods and Models," retrieved at <<http://research.microsoft.com/en-us/um/people/horvitz/mobile_opportunistic_planning.pdf>>, Proceedings of the Eleventh Conference on User Modeling (UM 2005), Jun. 2007, 10 pages.

Kamar, et al., "Mobile Opportunistic Commerce: Mechanisms, Architecture, and Application," retrieved at <<http://research.microsoft.com/en-us/um/people/horvitz/AAMAS_MCMarket.pdf>>, Proceedings of the Seventh International Conference on Autonomous Agents and Multiagent Systems, May 2008, 2 pages.

Search Report for PCT Application No. PCT/US20071014405, mailed on Dec. 11, 2007, 2 pages.

Letchner, et al., "Trip Router with Individualized Preferences (TRIP): Incorporating Personalization into Route Planning," retrieved at <<ftp://cs.pitt.edu/web/Backup/projects/n1p/conf/aaai2006/17/AAA106-297.pdf>>, Eighteenth Conference on Innovative Applications of Artificial Intelligence, Jul. 2006, 6 pages.

Weiser, Mark, "Some Computer Science Issues in Ubiquitous Computing," retrieved at <<http://acm.org>>, Communications of the ACM, vol. 36, No. 7, Jul. 1993, pp. 75-84.

Vanajakshi, et al., "Support Vector Machine Technique for the Short Term Prediction of Travel Time," retrieved at <<http://ieeexplore.ieee.org>>, Proceedings of the 2007 IEEE Intelligent Vehicles Symposium, Jun. 2007, pp. 600-605.

Hu, T. Y, "Simulation-Assignment-Based Travel Time Prediction Model for Traffic Corridors," retrieved at <<http://ieeexplore.ieee.org>>, IEEE Transactions on Intelligent Transportation Systems, vol. 13, No. 3, Sep. 2012, pp. 1277-1286.

Hu, et al., "Summary of Travel Trends, 2001 National Household Travel Survey," retrieved at <<http://nhts.ornl.gov/2001/pub/stt.pdf>>, U.S. Federal Highway Administration, 2004, 135 pages.

Patterson, et al., "Opportunity Knocks: a System to Provide Cognitive Assistance with Transportation," retrieved at http://vision.ucsd.edu/~kai/pubs/patierson_ubicomp04.pdf>>, UbiComp 2004, vol. 3205 of LNCS, 2004, 18 pages.

Marmasse, et al., "A User-Centered Location Model," retrieved at <<http://acm.org>>, Personal and Ubiquitous Computing, vol. 6, Issue 5-6, Dec. 2002, pp. 318-321.

Ashbrook, et al, "Using GPS to learn significant locations and predict movement across multiple users," retrieved at <<http://acm.org>>, Personal and Ubiquitous Computing, vol. 7, Issue 5, Oct. 2003, pp. 275-286.

Rish, I., "An empirical study of the naive Bayes classifier," retrieved at <<http://www.cc.gatech_edu/~isbell/reading/ papers/Rish.pdf>>, IJCAI-01 Workshop on Empirical Methods in AI, 2001, pp. 41-46.

Krumm, et al., "The Microsoft Multiperson Location Survey," retrieved at <<http://research.microsoft.com/apps/pubs/default.aspx?id=70201>>, Microsoft Research Technical Report No. MSR-TR-2005-103, 2005, 4 pages.

Coyne, et al., "Comparison of Differentially Corrected Gps Sources for Support of Site-Specific Management in Agriculture," retrieved at <<http://www.wkarc.org/FCKUploads/File/PCoyne_DGPS_Study.pdf>>, Kansas State University, Agricultural Research Center—Hays, 2003, 35 pages.

European Search Report for Application No. 06802991.7, corresponding to PCT Application No. PCT/US2006034608, mailing date Jun. 14, 2012, 6 pages.

* cited by examiner

ILLUSTRATIVE
DRIVING ROUTING
NETWORK
INFORMATION

ILLUSTRATIVE PUBLIC
TRANSPORTATION
ROUTING NETWORK
INFORMATION

TRANSPORT-DEPENDENT PREDICTION OF DESTINATIONS

BACKGROUND

An automobile may include a navigation system that provides travel guidance to a user. In operation, a typical navigation system allows the user to manually input a desired destination. The navigation system then computes a route from the user's present location to the desired destination. In the course of the user's travel, the navigation system provides prompts which guide the user along the computed route. This type of technology is useful, but is burdensome in that it requires the user to manually input the desired destination.

The research community has recently proposed various techniques for automatically determining the destination of a user who embarks on a trip via automobile, that is, before the user reaches the intended destination. However, there is room for improvement in this type of technology.

SUMMARY

A destination analysis module is described which estimates a destination of a user given a partial path (C) taken by the user within a geographic area. The destination analysis module operates by detecting a mode of transportation that a user uses to traverse the path (e.g., automobile, public transportation, walking, etc.). The destination analysis module then loads a model associated with the mode of transportation. The destination analysis module uses the model to estimate at least one likely destination associated with the partial path. By virtue of this approach, the destination analysis module estimates a destination (or destinations) in a manner that is dependent on the mode of transportation that the user is using to reach his or her intended destination.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative destination determination functionality for determining a likely destination of a user who is traveling within a geographic area via a particular mode of transportation. Section B describes illustrative methods which explain the operation of the destination determination functionality of Section A. Section C describes illustrative computing functionality that can be used to implement any aspect of the features described in Sections A and B.

This application is related to co-pending and common-assigned U.S. application Ser. No. 11/426,540, filed on Jun. 26, 2006, entitled "Methods for Predicting Destinations from Partial Trajectories Employing Open- and Closed-World Modeling Methods," naming the inventors of John C. Krumm, et al. The '540 Application is incorporated by reference herein.

Figure 9:
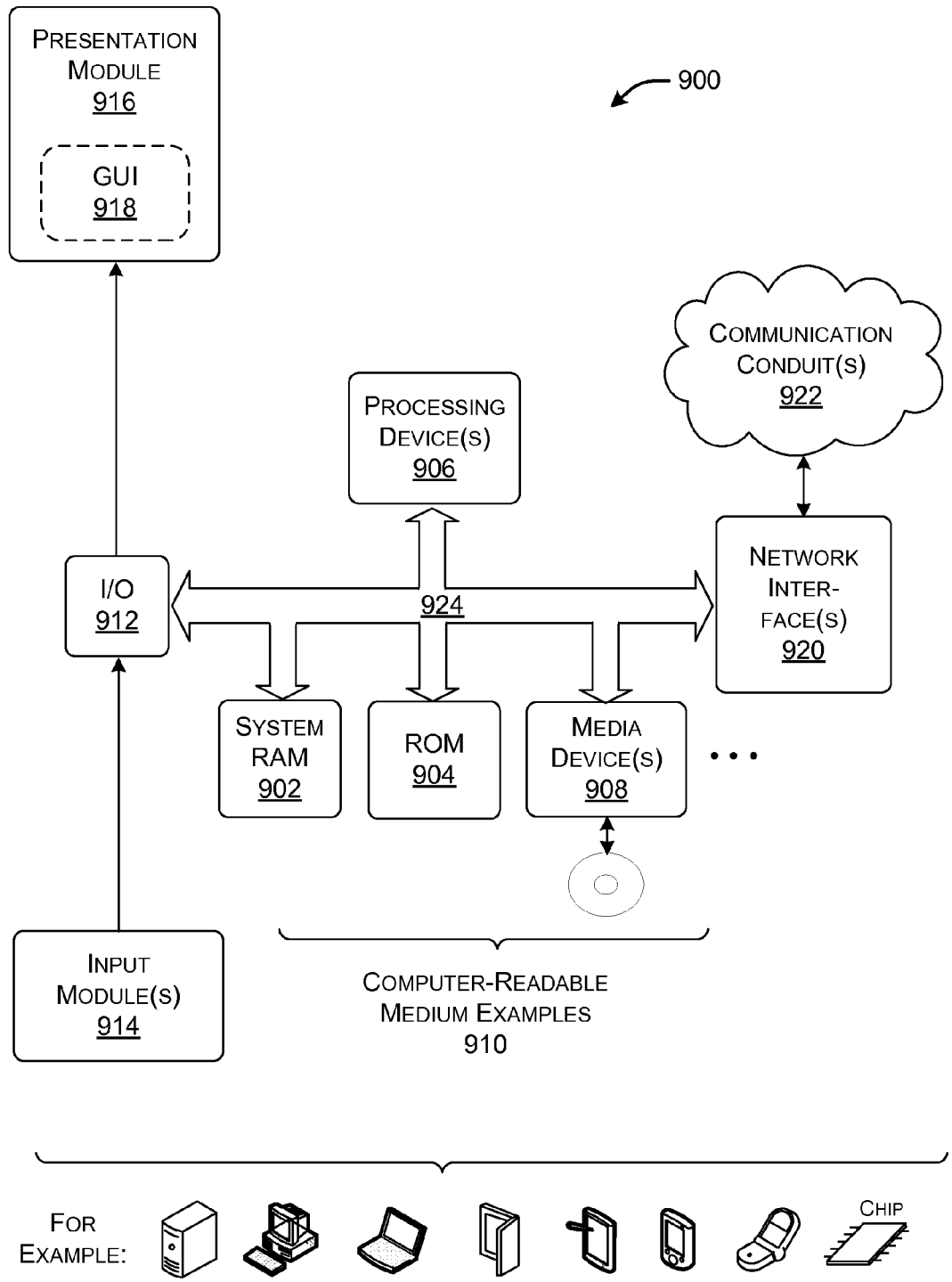
FIG. 9 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 9, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Destination Determination Functionality FIG. 1 describes illustrative destination determination functionality 100 for determining at least one likely destination of a user who is traveling within a geographic area via a particular mode of transportation 102. In one case, the geographic area can correspond to a tract of land having any size and any shape, and described in any number of dimensions (e.g., one dimension, two dimensions, three dimensions, etc.). For example, the geographic area can correspond to any of a neighborhood, development, borough, city, state, province, country, continent, region, etc. Alternatively, or in addition, the geographic area can correspond to an interior space, such as the layout of a business complex, a large warehouse, etc.

The destination determination functionality 100 can discretize the geographic region into any map location elements. For example, in the examples presented in FIGS. 2-4, the map location elements correspond to polygonal cells (e.g., square cells). But more generally, the cells can have any shape, size, and dimension; indeed, in one case, the cells can be reduced in size such they can be effectively considered as points. A user's location within such a geographic area can be approximated by identifying the cell which contains the user's actual position. Alternatively, the map location elements can correspond to intersections within the geographic area. A user's location within such a geographic area can be approximated by identifying the intersection that is closest to the user's actual position. Still other ways of discretizing the geographic region are possible.

In a first case, the mode of transportation 102 may correspond to a user-controlled mode of vehicular transportation, such as an automobile, truck, motorcycle, boat, submarine, plane, helicopter, bicycle, snowmobile, etc. Here, the user may freely choose the spatial course of his or her route through the geographic area, subject to the rules and laws governing the use of roadways, waterways, airspace, etc., and subject to any applicable physical constraints (e.g., including those imposed by the natural features of the terrain). Further, the user may generally choose the timing at which he or she departs, as well as the rate of travel through the geographic area (subject, again to the applicable rules and laws, physical constraints, etc.).

In another case, the mode of transportation 102 corresponds to a form of public transportation of any type, such as a bus, van, shuttle, subway, tram, ferry, plane, mine car, etc. In this case, the user can not generally control the spatial course of the route taken by the mode of transportation 102. Nor can the user generally choose the timing at which he or she departs, as well as the rate of travel. For example, a bus follows a predetermined route through the geographic area, and that route has predetermined stopping locations; further, the bus traverses the route based on a predetermined schedule.

In yet another case, the mode of transportation 102 corresponds to pedestrian mode of transportation, such as walking, running, skating, skiing, swimming, caving, etc. Like the first case, the user may freely choose the spatial course of the route, the timing of departure, and the rate of travel, subject to applicable rules and laws. For instance, a user who is walking may choose whatever road or pathway he or she desires, but a particular jurisdiction may prevent the user from walking on freeways, through private property, etc. The natural features of the geographic area may also constrain the walking route of a user; for example, the user may choose to avoid traveling over mountainous terrain, lakes, rivers, etc.

The modes of transportation identified above are cited by way of example, not limitation. Other environments may accommodate additional modes of transportation.

A position detection module 104 may register the position of the user as he or she moves within the geographic area. For example, the position detection module 104 may correspond to a GPS mechanism or the like. Alternatively, or in addition, the position detection module 104 can register the position of the user using cell tower triangulation, Wi-Fi triangulation, dead reckoning, image-based tracking (e.g., whereby a user's position in video is detected and tracked), and/or any other position-detection technique. Alternatively, or in addition, the position detection module 104 can represent any mechanism by which a user can manually report his or her position on a periodic basis or any other basis. In some environments, the position detection module 104 can also generate and report other sensor measurements which may have a bearing on the manner in which the user moves within an area. Such measurements can include accelerometer readings, gyroscopic readings, magnetometer readings, etc.

A user device 106 may represent a piece of equipment which accompanies the user on his or her trip. For example, in one case, the user device 106 may correspond to a computing device that is affixed to or otherwise associated with a vehicle. Alternatively, or in addition, the user device 106 may correspond to a portable user device that a user carries while traveling. Examples of such portable devices include mobile telephone devices, personal digital assistant devices, e-book reader devices, laptop computer devices, portable game devices, and so on.

In one case, the user device 106 may include the position detection module 104 as one of its components. In still other cases, some other system(s) or mechanism(s) implement the position detection module 104, besides the user device 106 or in addition to the user device 106.

In some environments, the position detection module 104 specifies the position information by providing a longitude and latitude reading. In other environments, the position detection module 104 can specify other dimensions of position, such as altitude. The position detection module 104 can also specify the time at which each position reading was taken. In addition, or alternatively, the position detection module 104 can report other readings, such as accelerometer readings, gyroscopic readings, magnetometer readings, etc. The term position information encompasses all such position-related data.

A destination analysis module 108 receives the position information from the position detection module 104. By way of overview, the destination analysis module 108 can use successive instances of the position information to automatically estimate the intended destination of the user, prior to the user actually reaching that destination. As will be clarified below, the destination analysis module 108 performs this task in a manner which takes into account the mode of transportation 102 of the user. For example, the destination analysis module 108 applies one set of considerations in predicting the destination of a user who is walking within the geographic area; it may apply another set of considerations in predicting the destination of a user who is driving an automobile within the geographic area.

In one case, the destination analysis module 108 can be implemented by separate functionality from the user device 106, such as by one or more server computers and associated data stores. In another case, the destination analysis module 108 can be implemented entirely by the user device 106 or some other device which is local with respect to the user. In yet another case, part of the destination analysis module 108 can be implemented by the user device 106 and part of the destination analysis module 108 can be implemented by a separate system. Additional information will be provided below regarding possible physical implementations of the destination analysis module 108, e.g., in the context of the explanation of FIG. 5.

The destination analysis module 108 can include (or can be conceptualized as including) plural modules. A path assessment module 110 defines a partial path (C) that a user has traversed within the geographic area, at any given time. For example, the path assessment module 110 can define the path as a temporally ordered series of map location elements (e.g., cells) through which the user has passed. Consider, for instance, the partial path (C) shown in FIG. 2. The cell labeled as (1) represents the start of the partial path. The cell labeled as (7) represents the current position of the user (which, in this case, does not correspond to the final destination of the user). More specifically, the path assessment module 110 can record a single entry (such as a cell index entry) for each cell which the user has entered. In some cases, the user may move out of a particular cell and then, at some later time, move back into that same cell. In this case, the partial path would include two entries for the cell that the user has passed through twice.

The path assessment module 110 can also determine the temporal characteristics of the partial path. These characteristics include the time at which the user has commenced the trip, as well as the rate at which the user traverses the path, at each point along the path. The path assessment module 110 can determine this rate information based on time stamps associated with individual instances of the position information received from the position detection module 104, and/or based on sensor readings provided by the position detection module 104, etc.

A transportation mode determination module 112 identifies the mode of transportation 102 being used by the user to traverse the path. The transportation mode determination module 112 can use any technique or combination of techniques to determine the mode of transportation 102. In one case, for example, the user may manually specify the mode of transportation, such as by inputting this information into an input mechanism of the user device 106. The user device 106 can then forward the manually inputted information to the destination analysis module 108.

In another case, the transportation mode determination module 112 can perform automated analysis to determine the mode of transportation 102. For example, the transportation mode determination module 112 can compare the spatial and temporal characteristics of the path to telltale patterns associated with different modes of travel. Alternatively, or in addition, the transportation mode determination module 112 can directly examine sensor readings provided by the position detection module 104, such as accelerometer readings, gyroscopic readings, magnetometer readings, and so on. The transportation mode determination module 112 can compare these readings with typical readings associated with different modes of transportation. If there is a match with respect to typical patterns and/or readings, the transportation mode determination module 112 associates the path with the identified mode of transportation.

For example, if the spatial and temporal characteristics of a path conform to a particular bus schedule, it is likely that the user is traveling via bus. Alternatively, if the path indicates that the user is moving slowly for an extended period of time, it is likely that the user is walking; this conclusion is strengthened if the user's path encompasses locations that are not accessible to motorized vehicles, and/or if the user's path otherwise exhibits characteristics indicative of ambulatory motion. Alternatively, if the path indicates that the user is traveling at a very high rate of speed over a course that does not conform to any roadway, it is likely that the user is traveling via airplane; this conclusion can alternatively, or in addition, be strengthened or definitively confirmed by examining the altitude of the user, if that data is available. These pattern-matching examples are cited by way of illustration, not limitation. The transportation mode determination module 112 can apply yet further heuristics to detect the mode of transportation 102, based on any available evidence associated with the trip that the user is making.

In many of the examples presented herein, it will generally be assumed that the user uses a single mode of transportation 102 to travel from a starting location to the intended destination. But the user can also employ two or more modes of transportation to reach the desired destination. For example, the user may take the subway to a station that is closest to his or her desired destination. The user may then walk for the remainder of the trip to the desired destination. To address this type of scenario, the transportation mode determination module 112 can continually (or periodically) monitor the characteristics the user's path as it evolves. This enables the transportation module determination module 112 to detect whether the user has transitioned to a different mode of transportation.

In some cases, the transportation mode determination module 112 may not be able to determine the mode of transportation with sufficient confidence. The transportation mode determination module 112 can be configured to address this situation in different ways. In one case, the transportation mode determination module 112 can select a default mode of transportation (such as an automobile-related mode) when it cannot ascertain the mode of transportation with sufficient confidence. In other cases, the transportation mode determination module 112 can select a mode of transportation that is most commonly used by the user who is taking the trip, or the mode of transportation that was last selected by the user, and so on.

A configuration module 114 loads a model associated with the identified mode of transportation 102 into a destination prediction module 116. Here, "loads" refers to any manner by which the configuration module 114 makes the model accessible to the destination prediction module 116. For example, loading may comprise providing a copy of the model for storage in the destination prediction module 116; or loading may comprise providing a pointer to the model, etc. The destination prediction module 116 then estimates at least one intended destination of the user based on the partial path, using the model that has been loaded. In this manner, the destination prediction module 116 performs mode-specific analysis in determining the intended destination(s) of the user.

More specifically, a model refers to a set of information items that the destination prediction module 116 uses to perform its prediction. These information items are referred to as components herein. A data store 118 may store these components. Additional information regarding the nature of these components will be set forth below in greater detail, e.g., in the context of the explanation of FIG. 6. As a preview of that explanation, one component of a model corresponds to network routing information. The network routing information describes a system of travel routes that are available to the user in moving within the geographic area. Different network routing information applies to different respective modes of transportation because different types of routes are available to different respective modes of travel. For example, a user driving his or her own car has different route options compared to a user traveling via bus or subway.

The following explanation will also provide additional information regarding the manner in which the destination prediction module 116 estimates the desired destination of the user. By way of overview, in one approach, the destination prediction module 116 can use Bayes analysis to assign a probability to each map location element (e.g., each cell) within the geographic area. That probability defines the likelihood that that map location element represents the intended destination of the user. The destination prediction module 116 identifies the map location element(s) with the highest probability(ies) as the most probable destination(s) of the user.

The dashed box entitled "Any Application . . . " 120 represents any application that makes use of the estimated destination provided by the destination prediction module 116. For example, an application may notify the user of the estimated destination and then offer the user navigation instructions to reach the intended destination. Alternatively, or in addition, an application can notify the user of services that are located nearby the estimated destination (and/or the route leading to the estimated destination). Alternatively, or in addition, an application can perform a search that is based on the estimated destination (and/or the route leading to the estimated destination), and then present the user with the results of such a search. Alternatively, or in addition, an application can present the user with any travel warnings associated with the estimated destination (and/or the route leading to the estimated destination). Alternatively, or in addition, an application can present the user with advertisements related to the estimated destination (and/or the route leading to the estimated destination), and so on. These applications are cited by way of example, not limitation.

Figure 2:
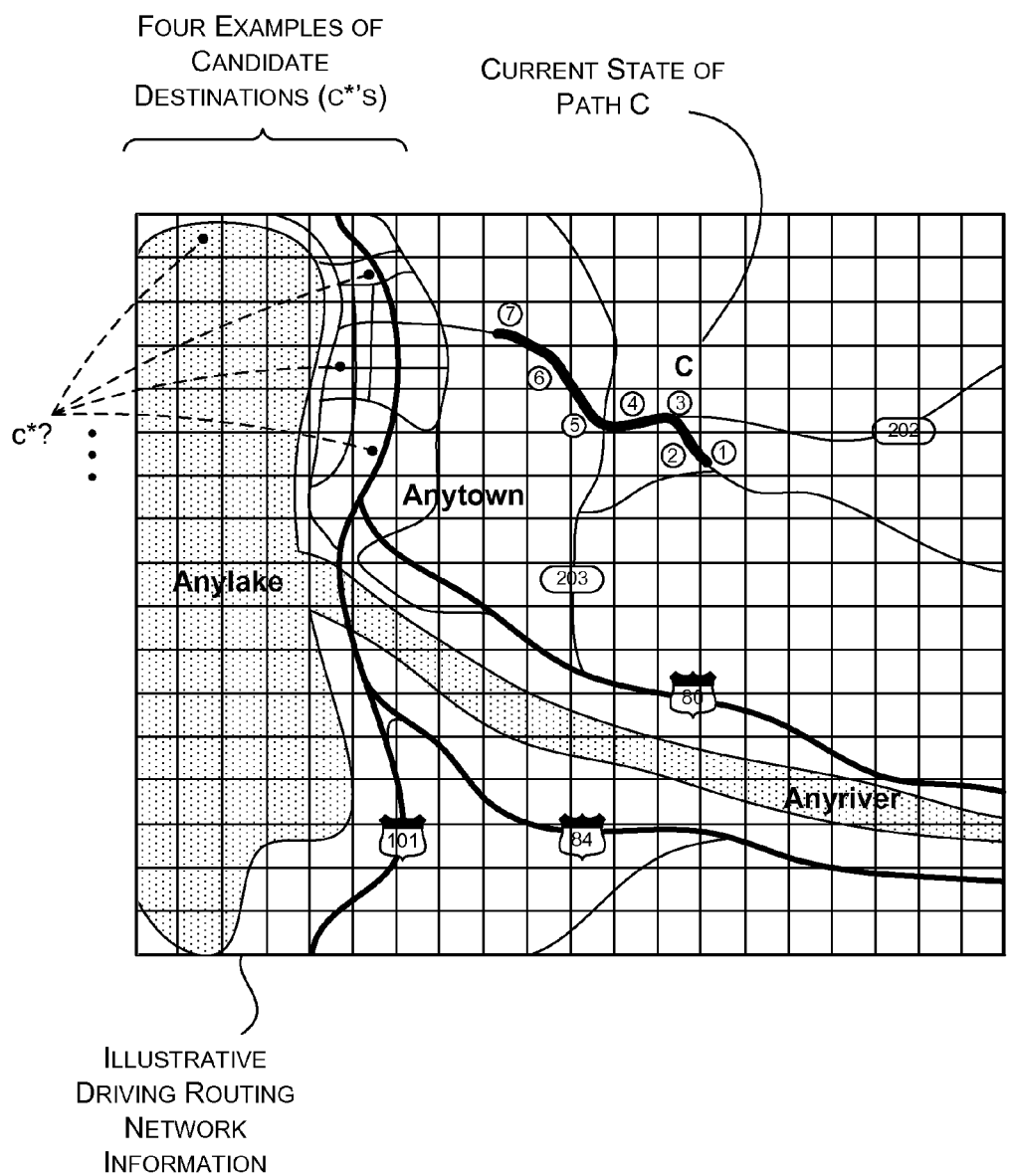
FIG. 2 shows a partial path taken by the user within the geographic area, using a particular mode of transportation.

Advancing to FIG. 2, this figure shows a hypothetical geographic area through which a user drives an automobile. The geographic area is divided into an array of square cells. But, as stated above, the map location elements can have any size, shape, and dimension. For example, the geographic area can also express the altitude variations in a user's trip by using three-dimensional map location elements, such as cubes or the like.

The transportation mode determination module 112 detects that the user is driving a car because the spatial and temporal characteristics of the user's movement match the telltale patterns and/or sensor readings associated with user-controlled automobile travel. For example, the relevant characteristics of the user's travel may include any of: (a) the velocity at which the user travels; (b) the manner in which the user accelerates and decelerates; (c) the routes over which the user travels; (d) the intermediary stopping points selected by the user, and so on. This information can be obtained from various sources, such as the timestamp information associated with GPS readings, other sensor readings (accelerometer readings, etc.), and so on. In response to this detection, the configuration module 114 loads an automobile-related model into the destination prediction module 116. For example, the model includes routing network information that defines roadways available for use by automobiles. The routing network information may exclude routes that are not available to automobile traffic (such as pedestrian walkways).

At the present time represented in FIG. 2, the user has traversed a path (C) that spans a series of seven cells, corresponding to the temporally ordered cell set $\{1, 2, 3, 4, 5, 6, 7\}$. This means that the user's automobile is currently located at a position encompassed by cell No. 7. Presume that cell No. 7 is not the final destination of the user. At this juncture, the destination prediction module 116 is called on to predict at least one intended destination of the user. This prediction takes into account the partial path in its present state, as well as information imparted by the mode-specific model (in this case, an automobile-related model).

More specifically, the destination prediction module 116 considers each cell in the geographic area as a candidate destination ($c^*$) of the user—that is, as a potential end point of the user's trip. For example, FIG. 2 identifies four such representative candidate destinations (although every cell corresponds to a candidate destination). The destination prediction module 116 calculates a probability for each of these candidate destinations. Each probability quantifies the likelihood that a corresponding cell represents the intended destination of the user. The cell(s) with the highest probability corresponds to the most likely candidate destination(s).

Assume that the user next moves to the cell to the immediate left of cell No. 7. In response, the destination prediction module 116 recalculates the probability that each candidate cell presents the actual destination of the user. More specifically, the user's movement draws the user away from some cells and closer to other cells. In response, the destination prediction module 116 can be expected to increase the probabilities of some cells, and decrease the probabilities of other cells. (Additional details regarding the nature of the calculations performed by the destination prediction module 116 will be provided below in the context of the explanation of FIG. 6.) The above-described process continues until the user reaches his or her actual final destination, e.g., corresponding to cell No. 11 shown in FIG. 3. Each time the user enters a new cell, the destination prediction module 116 recalculates the probabilities for all of the candidate destinations.

Figure 3:
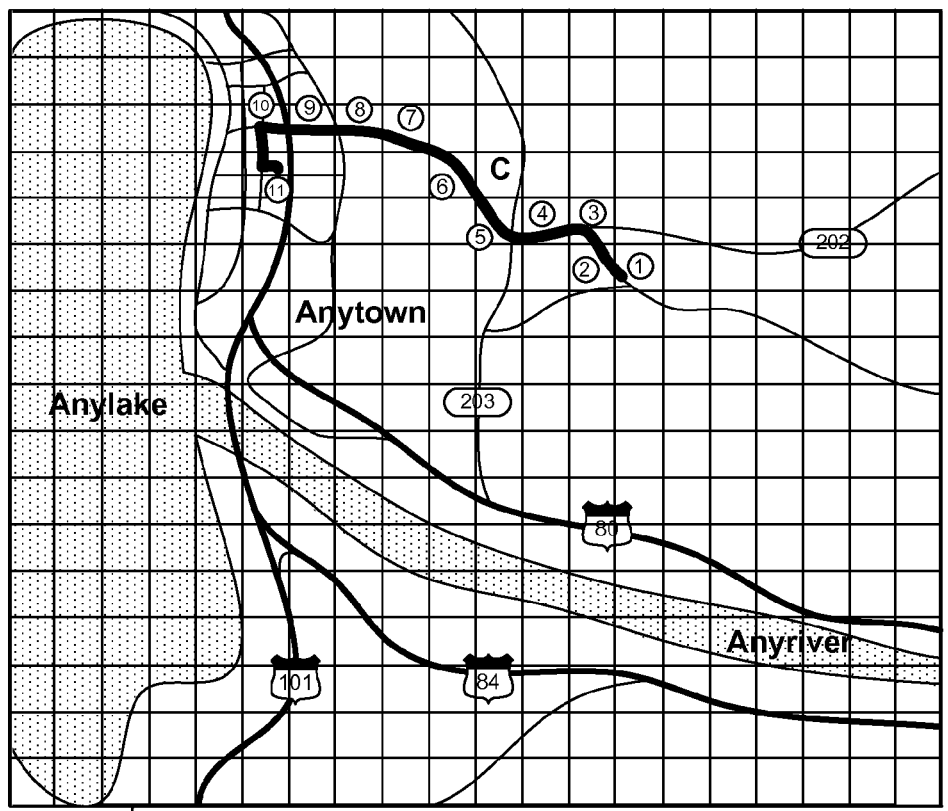
FIG. 3 shows a later state of the path of FIG. 2. At this time, the user has reached his or her intended destination.
Figure 4:
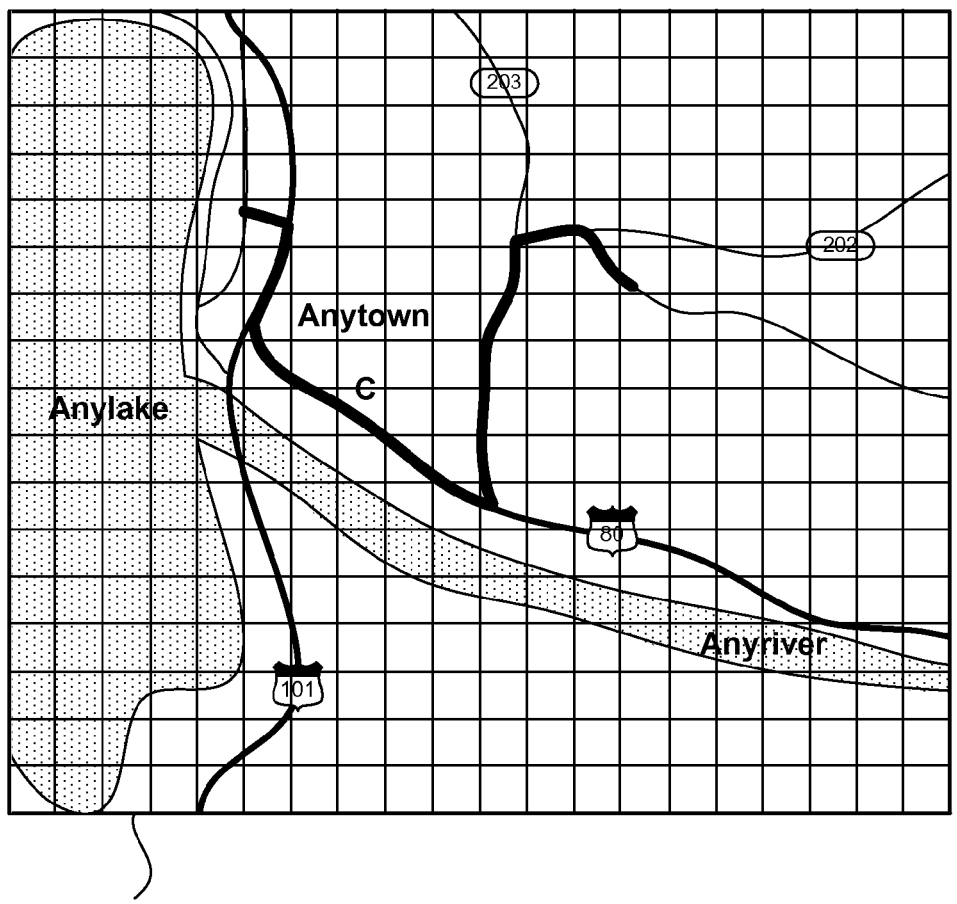
FIG. 4 shows a partial path taken by a user within the geographic area, using a different mode of transportation compared to the case of FIG. 2.

FIG. 4 shows a geographic area which encompasses the same map region as the case of FIGS. 2 and 3. However, in this case, the user is now traveling via a particular bus line, rather than a self-driven automobile. Hence, FIG. 4 shows only those roadways over which the bus is permitted to travel (as per the bus's schedule). These roadways represent a subset of the more complete set of routes shown in FIG. 2.

Other modes of transportation may exhibit yet other route options. For example, pedestrian routing network information may exclude certain roadways shown in FIGS. 2 and 3 (representing routes that are not accessible to pedestrians); in addition, or alternatively, the pedestrian routing network information may include additional pathways that are not shown in FIGS. 2 and 3 (representing routes that are not accessible to motorized vehicles). Different instances of routing network information also convey different characteristics pertaining to the route options. For example, the routing network information for automobile travel will convey rate-of-travel information for automobiles (e.g., which may correspond to speed limit information associated with the available routes); in contrast, the routing network information for pedestrian travel will convey rate-of-travel information associated with walking.

Figure 1:
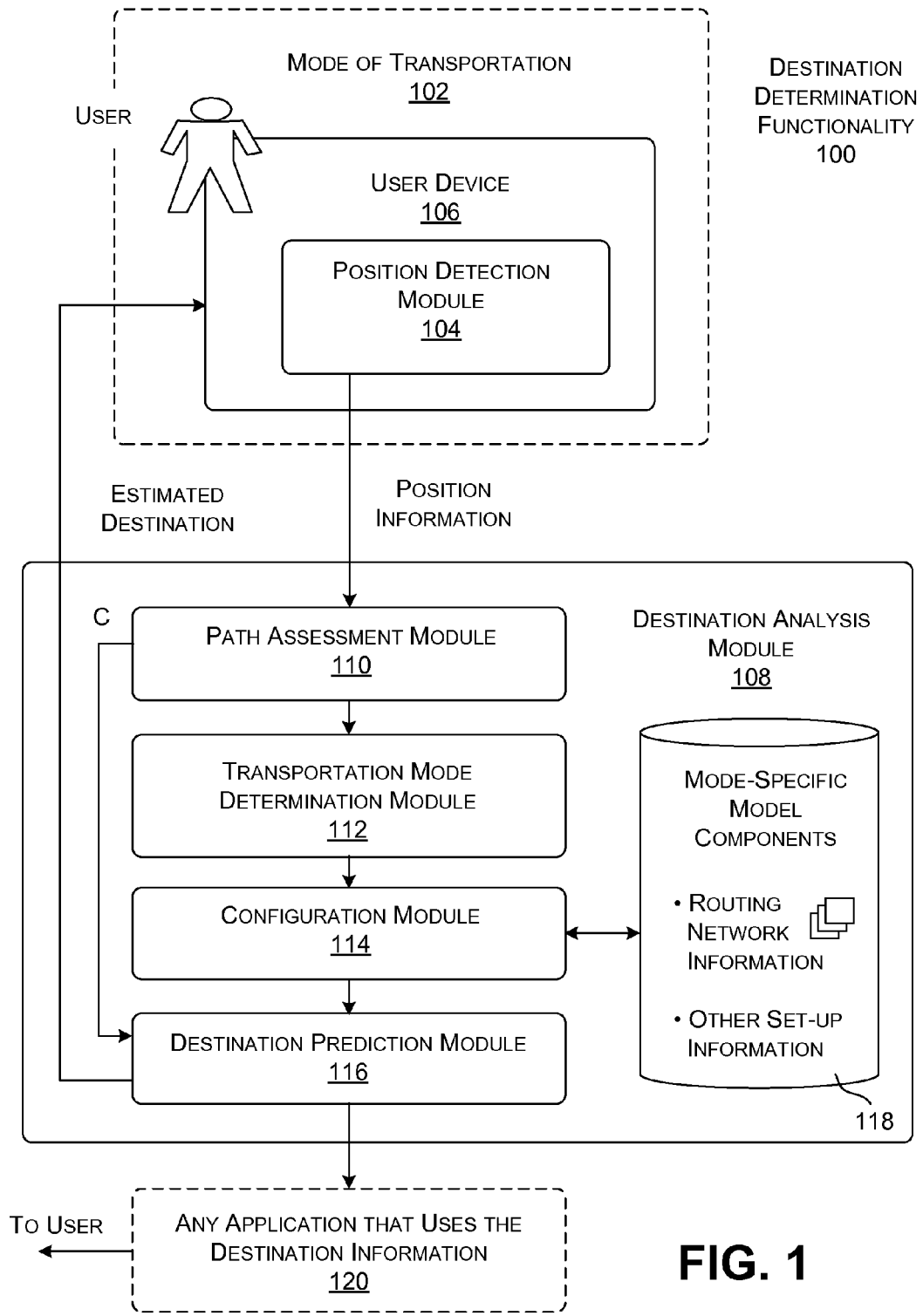
FIG. 1 shows illustrative destination determination functionality for predicting at least one destination of a user who is traveling within a geographic area.
Figure 5:
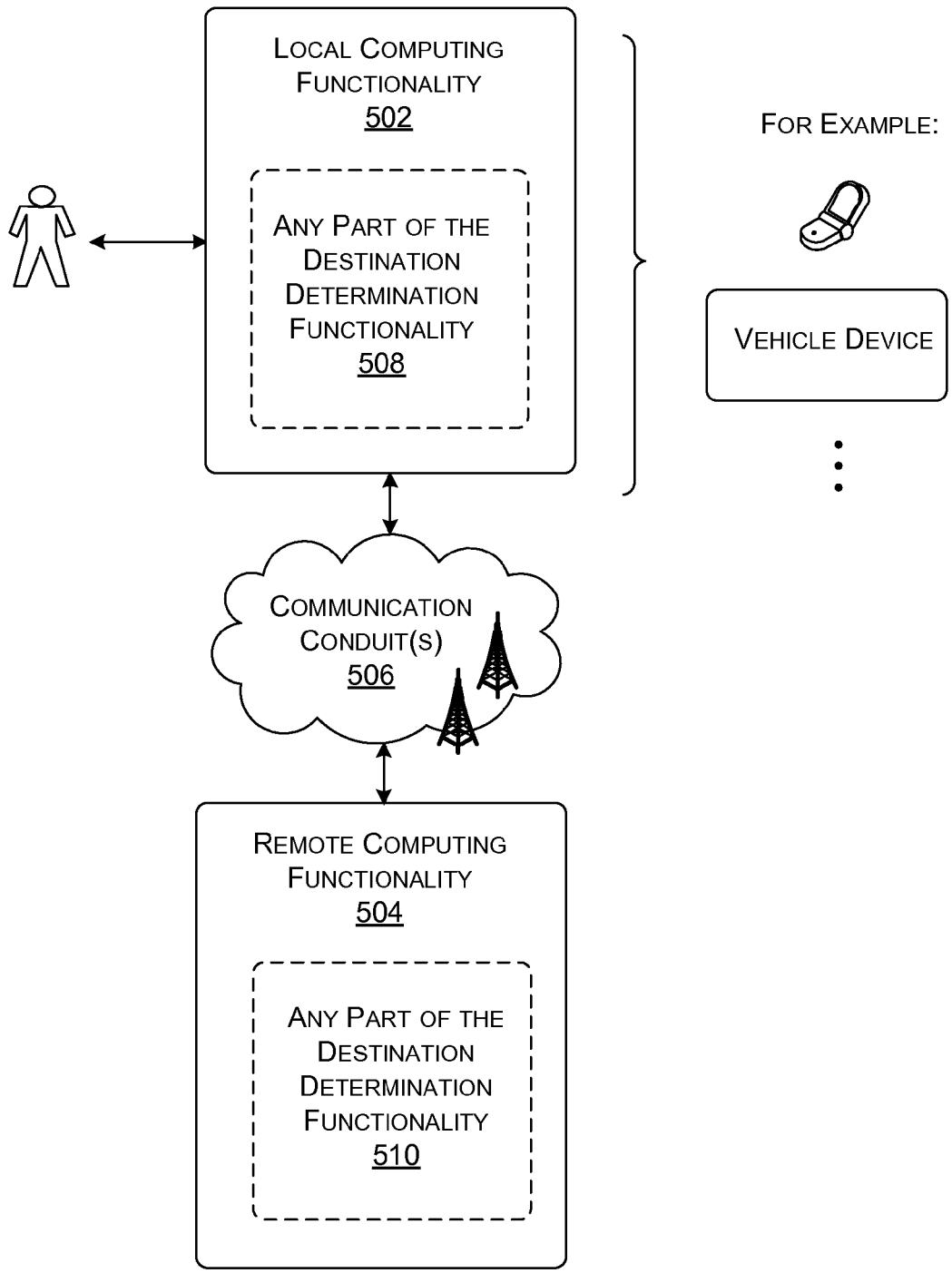
FIG. 5 shows illustrative equipment for implementing the destination determination functionality of FIG. 1.

FIG. 5 shows one implementation of the destination determination functionality 100 shown in FIG. 1. The equipment shown there includes local computing functionality 502 (which is local with respect to the user) and optional remote computing functionality 504 (which is remote with respect to the user), coupled together via communication conduit(s) 506. The local computing functionality 502 includes any part 508 of the destination determination functionality 100, while the remote computing functionality 504 (if used) includes any other part 510 of the destination determination functionality 100. Different environments can allocate the tasks between the local computing functionality 502 and the remote computing functionality 504 in any manner. For example, in one scenario, the remote computing functionality 504 can perform only the most processor-intensive parts of the estimation of the destination, such as the calculation of routes between pairs of locations within the geographic area (to be described in greater detail below). This type of processor-intensive computation can be performed in an offline manner, e.g., by pre-computing the routes before they are needed. Alternatively or in addition, the processor-intensive computation can be performed in a dynamic manner when this computation is needed during the user's travel.

In yet another scenario, the local computing functionality 502 can implement all of the tasks of the destination determination functionality 100. In another case, the remote computing functionality 504 can implement all of the tasks of the destination determination functionality 100 (except that the local computing functionality 502 may still forward position information or data from which the position information can be derived). Still other allocations of tasks between different computing modules are possible.

The local computing functionality 502 may physically represent any type of device, such as a portable (e.g., personborne) user device (e.g., a mobile telephone device, personal digital assistant device, e-book reader device, laptop computer device, portable game device, and so on). Alternatively, or in addition, the local computing functionality 502 may represent a vehicle-borne computing device or any kind. The remote computing functionality 504 may represent one or more computer servers and associated data stores. Colloquially speaking, for instance, the remote computing functionality 504 may represent a cloud computing service. That service may have cluster computing resources or other high-performance computing resources. The communication conduit(s) 506 may represent any type of network(s), including any type of local area network(s), and/or any type of wide area network (e.g., the Internet), governed by any protocol or combination of protocols. The communication conduit(s) 506 may also incorporate wireless communication functionality (e.g., cell towers, base stations, etc.) for communicating with user devices in a wireless manner. The communication conduit(s) 506 can also incorporate hardwired links and associated routing infrastructure.

Figure 6:
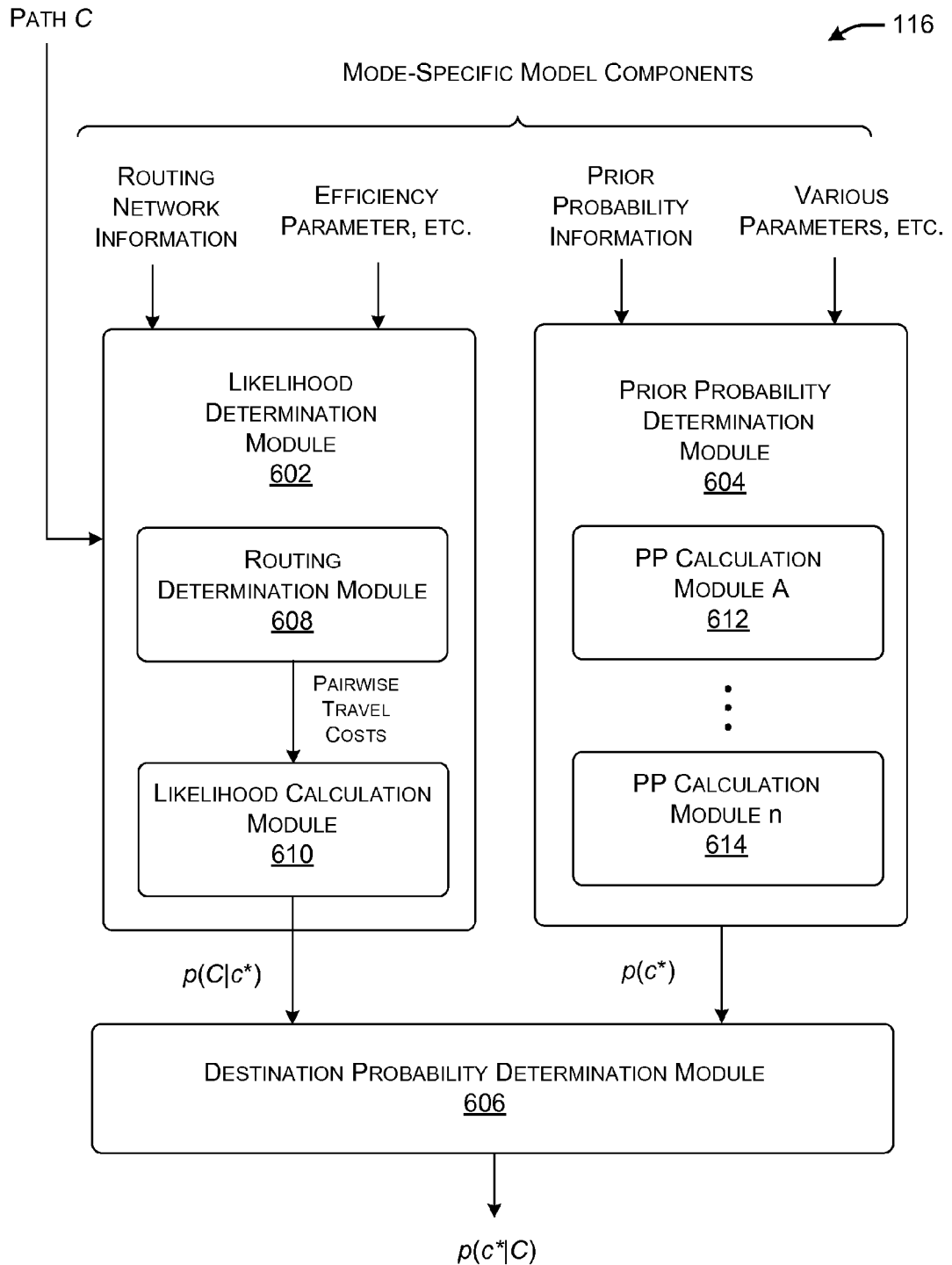
FIG. 6 shows one way to implement a destination analysis module. The destination analysis module is a component of the destination determination functionality shown in FIG. 1.

FIG. 6 shows additional details regarding one illustrative implementation of the destination prediction module 116, which was introduced in FIG. 1. To repeat, the destination prediction module 116 performs the task of estimating an intended destination of the user based on a partial path (C) traversed by the user at any given time. The estimated destination corresponds to the map location element (e.g., cell) having the highest probability. In other cases, the destination prediction module 116 may identify and convey a set of map location elements that represent likely destinations (e.g., by identifying the n map location elements having the highest probabilities, sorted by probability). This is may be appropriate because, in some cases, two or more map location elements may have the same (or substantially the same) probability. However, to facilitate explanation, it will henceforth be assumed that there is a single map location element that has the highest probability, and that this map location element is selected as the single predicted destination of the user.

In one implementation, the destination prediction module 116 predicts the destination using Bayes rule, e.g., based on the following expression:

$$p(c^* \mid C) = \frac{p(C \mid c^*)p(c^*)}{\sum_{j=1}^{N} p(C \mid c_{(j)})p(c_{(j)})}.$$

In this expression, $p(c^*\mid C)$ represents the probability that a candidate destination (associated with a candidate map location element $c^*$) represents an actual destination of the user, given the path C. The term $p(C\mid c^*)$ corresponds to the likelihood of the partial path C given a particular candidate destination $c^*$. The term $p(c^*)$ represents a prior probability that $c^*$ represents the actual destination of the user. And the denominator of the above expression corresponds to a normalizing factor (normalizing f actor), which ensures that the distribution of $p(c^*\mid C)$ sums to 1 when summed over all candidate destinations.

In the context of FIG. 6, a likelihood determination module 602 computes the term $p(C\mid c^*)$, while a prior probability determination module 604 computes the term $p(c^*)$. A destination probability determination module 606 computes $p(c^*\mid C)$ based on $p(C\mid c^*)$, $p(c^*)$, and the normalizing factor.

As described above, the configuration module 114 configures the destination prediction module 116 by loading a model which reflects the mode of transportation 102 being used by the user to traverse the geographic area. The model can be conceptualized as having different components. Each component imparts different information. More specifically, some components of the model supply information that is used by the likelihood determination module to compute $p(C\mid c^*)$. Other components of the model supply information that is used by the prior probability module 604 to compute $p(c^*)$. More specifically, illustrative model components are described below.

Routing Network Information.

The configuration module 114 can supply routing network information to the likelihood determination module 602. The routing network information describes the routes that are available to the user in traversing the geographic area, in view of the mode of transportation 102 being used by the user. (As described above, different routes may be available to different modes of transportation.) In addition, the network routing information can describe other characteristics of the routes. For example, the routing network information for an automobile can identify speed limits (and/or typical travel speeds) associated with different roadways. The routing network information for a subway system can describe the time schedules of different subway lines, and so on.

More specifically, the routing network information can be expressed as a graph having a collection of nodes and edges, where the edges connect the nodes together. The nodes represent locations and the edges represent pathways between the locations. More specifically, in one implementation, the routing network information can assign directions to the routes. For example, an edge associated with a one-way street points in a single direction, i.e., from a first node to a second node. An edge associated with a two-way street bi-directionally points from the first node to the second node, and from the second node to the first node. The routing network information for public modes of transportation can also define different sets of edges (and nodes) for different respective lines or schedules of transportation. For example, two different train lines may travel over the same route, traveling from point A to point B. Yet the first train line may include more stops along the way compared to the second train line. In other words, the second train line may represent an express service. Accordingly, the routing network information for the first train line may include more edges (and nodes) compared to the routing network information for the second train line. In other words, the different train lines can effectively be treated as different modes of transportation, although otherwise related in one or more respects.

The routing network information can also assign a cost measure (or plural cost measures) to each edge. The likelihood determination module 602 uses the cost measure(s) in comparing routes with each other, e.g., with the ultimate objective of selecting the route between two points that is deemed most appropriate.

For example, one cost measure is time of travel, representing the amount of time it takes to travel from a source node to a destination node. In this case, the likelihood determination module 602 can compare routes based on the differing amounts of time it takes to reach the designated destination via these routes (based on the premise that is desirable to reach a destination in the shortest amount of time as possible). Another cost measure is physical distance, corresponding to the physical distance between a source node and a destination node. In this case, the likelihood determination module 602 can compare routes based on the physical distances associated with the routes (based on the premise that is desirable to reach a destination using the physically shortest possible path). Another cost measure is financial cost, corresponding to the amount of money it takes to travel between a source node and a destination node. In this case, the likelihood determination module 602 can compare competing routes based on the different financial costs of taking the routes (based on the premise that is desirable to reach a destination using the cheapest possible route). These cost measures are cited by way of example, not limitation. In other cases, the likelihood determination module 602 can use a combination of two or more cost measures in assessing the desirability of a path with respect to other paths.

Different instances of routing network information, for different modes of transportation, may specify the use of different cost measures. For example, the routing network information for an airline may place more emphasis on the financial cost of its links compared to, for example, the routing network information for an automobile. Other factors may also influence the choice of cost measure(s). For example, an increase in the cost of automobile fuel may increase the importance of a distance-related cost measure relative to a time-related cost measure in assessing the suitability of routes, e.g., because users may now be more concerned with financial expenditure compared to timeliness of arrival.

Other Information Supplied to the Likelihood Determination Module.

The configuration module 114 can also supply one or more parameters which influence the calculations performed by the likelihood determination module 602. For example, the configuration module 114 can supply an efficiency parameter ($\alpha$) that describes the efficiency at which users advance to their desired destination within the geographic area. The efficiency parameter can be empirically determined by analyzing the directness at which users advance to their desired destinations in a particular environment. Generally, the efficiency parameter will be greater than 0.5 if users, on average, efficiently move towards their destinations.

The value of the efficiency parameter can depend on the mode of transportation being used. For example, for the case of automobile travel, in one particular environment, $\alpha=0.625$. Additional information will be provided below regarding the context in which the likelihood determination module 602 applies the efficiency parameter.

Prior Probability Information.

The configuration module 114 can also supply prior probability information to the prior probability determination module 604. For each possible candidate destination, the prior probability information describes the prior probability that the candidate destination represents the actual destination of the user, that is, without considering the influence of the partial path C. The prior probability information, in turn, can depend on different factors. And at least some of the factors may depend on the mode of transportation that the user is using to travel within the geographic area. The parts of the probability information that correspond to different factors can be conceptualized as different prior probability components of the model.

For example, a trip time prior probability component can identify probabilities associated with different trip durations. In other words, this prior probability component describes a distribution of possible trip durations within the geographic area. The destination prediction module 116 can use this prior probability component to identify the likelihood that a user will visit certain locations, that is, based on the amount of time it takes to reach those locations (with respect to a present location of the user). The distribution of trip durations for a first mode of transportation can generally be expected to differ from the distribution of trip durations for a second mode of transportation. For example, in some environments, the average travel time for walking trips may be shorter than the average travel time for automobile trips.

A point-of-interest (POI) prior probability component can identify probabilities based on different types of points of interest. The destination prediction module 116 can use this prior probability component to identify the likelihood that a user will visit locations which encompass or are otherwise associated with these types of points of interest. For example, this prior probability component can indicate that a user is more likely to visit a restaurant within a particular area compared to a dentist. Again, the probabilities associated with this prior probability component may differ for different modes of transportation. For example, a user who is walking may be more likely to visit a sidewalk kiosk compared to a user who is driving.

A ground cover prior probability component can identify probabilities for different types of ground cover found within the geographic area, with respect to the mode of transportation. The destination prediction module 116 can use this prior probability component to identify the likelihood that a user will visit certain locations, in this case, based on the ground cover classification of those locations. For example, a user who is driving an automobile may be more likely to visit a cell that is classified as commercial, industrial, transportation-related, and/or residential, compared to, for example, a cell that is classified as a water-related or forestland. Again, the probabilities associated with this prior probability component may differ for different modes of transportation. For example, a user who is walking may be more likely to visit an area of high vegetation (such as a park) compared to a user who is driving.

A user history prior probability component can identify probabilities based on previous destinations visited by the user. The destination prediction module 116 can use this prior probability component to identify the likelihood that a user will visit certain locations, in this case, based on whether the user has visited those locations in the past and/or whether the user has visited nearby or otherwise similar locations. For example, this prior probability component may indicate that a user is more likely to seek out a restaurant that he or she has visited several times in the past, compared to a restaurant that the user has never visited, or has infrequently visited. In other cases, this prior probability component may indicate that a user is also likely to visit a restaurant that is nearby other establishments that the user has visited in the past, although the user may have never actually visited that particular restaurant in the past. Again, the probabilities associated with this prior probability component may differ for different modes of transportation. For example, consider the case of a user who almost invariably takes the subway to and from her place of work. The user history prior probability component may indicate that the user's place of work is a likely destination of the user when the user is taking a trip by subway, but not by other modes of travel.

These prior probability components are cited by way of example, not limitation. The prior probability determination module 604 can take into consideration any other factors which have a bearing on the likelihood that a user will visit a particular destination (such as any kind of demographic information associated with the destination, etc.). Alternatively, or in addition, other environments can exclude one or more of the prior probability components described above.

Other Information Supplied to the Prior Probability Determination Module.

The configuration module 114 can also supply one or more parameters and associated probability information to the prior probability determination module 604. The prior probability determination module 604 uses these parameters to modify or otherwise qualify the information imparted by the prior probability components described above. Illustrative factors include traffic, time of day, weather, region, etc. For example, consider the case of the point-of-interest prior probability component. This component may identify the relative popularity of a particular establishment, which correlates with the probability that a user will visit that establishment in the future. But that popularity also may vary depending on whether the traffic is heavy or light near the establishment, and/or depending on whether it is day or night, and/or depending on whether it is sunny or raining, and/or depending on whether the establishment (e.g., which may be a chain restaurant) is located in city A as opposed to city B, and so on. The values of these parameters may also vary depending on the mode of transportation that is being used. For example, a user's inclination to visit a particular restaurant may be less impacted by the rain when the user is traveling by automobile, compared to the case in which the user is traveling on foot.

Any of the above-described parameters can alternatively, or in addition, be expressed as probability components in their own right. For example, a probability component can express probabilities based on the average rainfall, average traffic, etc. associated with different map regions.

The prior probability information and parameters described above can be obtained or derived from various sources. For example, the information imparted by the trip time prior probability component can be obtained from empirical studies of actual trip durations taken by users within particular areas, for particular modes of transportation. The information imparted by the point-of-interest prior probability component can be obtained from one or more business directories, which reveal the locations of different types of businesses; that information, can be then be combined with empirical studies which reveal the relative popularity of different types of businesses.

Now referring to the likelihood determination module 602 in greater detail, this component includes a routing determination module 608. The routing determination module 608 computes routes between pairs of locations within the geographic area, e.g., between location A and location B, between location A and location C, etc. (To simplify calculation, in one environment, it is assumed that the cost from location x to location y is the same as the cost from location y to location x.) The routing determination module 608 also quantifies the cost of each such route, with respect to any cost measure(s) (e.g., time, distance, financial cost, etc.). The routing determination module 608 can use any functionality to perform this task, such as any route planning functionality. The route planning functionality can select a route between two identified locations that minimizes an identified cost measure (or plural cost measures). The route planning functionality, in turn, can use any algorithm to perform this route-planning task, such as Dijkstra's shortest path algorithm. Alternatively, or in addition, the route planning functionality can use an accelerated-processing technique which leverages high-efficiency computing resources. One such technique is the PHAST algorithm described in DELLING, et al., "PHAST: Hardware-Accelerated Shortest Path Trees," Microsoft Research Technical Report No. MSR-TR-2010-125, Microsoft® Corporation, Redmond, Wash.

The routing determination module 608 can perform its computations using the local processing functionality 502, or the remote processing functionality 504, or a combination of the local processing functionality 502 and the remote processing functionality 504. Further, as described above, the computations performed by the routing determination module 608 can be performed in an offline manner (before they are needed), or in a dynamic manner (as they are needed), or some combination thereof. For example, in an offline manner of operation, the routing determination module 608 can compute a cost of traversal between each pair of map location elements in a geographic area, where that cost can be expressed in any of the ways described above.

A likelihood calculation module 620 uses the results of the routing determination module 608 to compute p(C|c*). More specifically, (C|c*) can be expressed as:

$$p(C \mid c^*) = \prod_{i=2}^{n} \begin{cases} \alpha & \text{if } c_i \text{ is closer to } c^* \text{ than any previous cell in } C \\ 1 - \alpha & \text{otherwise.} \end{cases}$$

Figure 7:
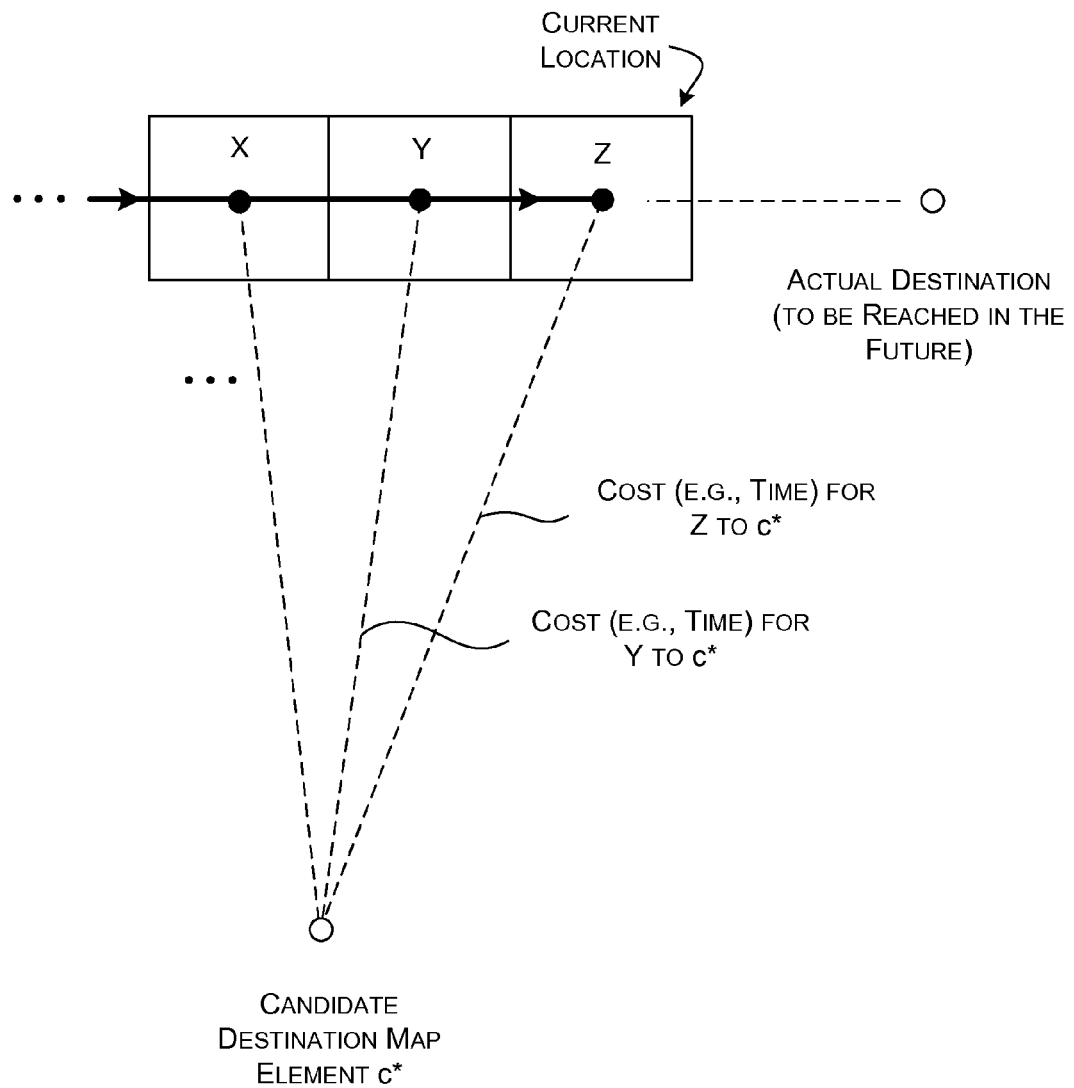
FIG. 7 depicts a principle underlying the operation of a likelihood determination module. The likelihood determination module is a component of the destination analysis module of FIG. 6.

FIG. 7 provides an example which clarifies the principle underling the above expression. In this case, the user has taken a partial path C which traverses at least cells X, Y, and Z. Cell Z is the last cell traversed by the path, meaning that the user's present location lies somewhere in this cell. At this point, the likelihood calculation module 610 determines whether the cost of the route from cell Z to a candidate destination c* is smaller than the cost (such as time of travel) of the route between any other cell in C and the candidate destination c*. That is, the likelihood calculation module 610 determines whether the Z-to-c* cost is less than the Y-to-c* cost, and whether the Z-to-c* cost is less than the X-to-c* cost, etc. If this condition is met, the likelihood determination module 610 will multiply the previous value of p(C|c*) by the value a to provide an updated p(C|c*). If the above-described condition is not met, then the likelihood determination module 610 will multiply the previous value of p(C|c*) by the value (1−α). (Note that the previous value of p(C|c*) represents the value of p(C|c*) that was computed when the user reached the prior cell, Y, in the path C.) The likelihood calculation module 610 performs this operation for each candidate destination c*, and for each time the user enters a new cell.

Less formally stated, the likelihood calculation module 610 operates to penalize those candidate destinations that the partial path C is successively advancing away from. In contrast, the likelihood calculation module 610 bolsters the probability of those candidate destinations that the partial path C is successively advancing towards.

Returning to FIG. 6, the prior probability determination module 604 can include (or can be conceptualized as including) one or more prior probability (PP) calculation modules (e.g., PP calculation modules 612, . . . , 614). Each PP calculation module identifies prior probabilities for candidate destinations with respect to a particular factor, associated, in turn, with a particular prior probability component. For example, a prior probability (PP) calculation module A 612 can compute the prior probability of the candidate locations based on trip time probability information, as imparted by the trip time prior probability component. A PP calculation module B 614 can compute the prior probability of the candidate locations based on point-of-interest probability information, as imparted by the point-of-interest prior probability component, and so on.

The prior probability determination module 604 can compute a consolidated prior probability value p(c*) for a particular candidate destination by multiplying together the component prior probability values computed by the respective individual PP calculation modules (e.g., PP calculation modules 612, . . . 614). For example, assume that there are three factors (a, b, c) that influence the prior probability value (p(c*)) of a particular candidate destination c*; in that case, $P(c^*)=p_a(c^*)p_b(c^*)p_c(c^*)$. When computed for all candidate destinations, the values of p(c*) form a distribution of prior probabilities over the geographic area. The prior probability determination module 604 further normalizes this distribution so that it sums to 1 when summed over all candidate destinations.

Finally, for each candidate destination c*, the destination probability determination module 606 receives the value of p(C|c*) from the likelihood determination module 602, and the value of p(c*) from the prior probability determination module 604. The destination probability determination module 606 then computes the value of p(c*|C) based on these input values, using the Bayes rule expression set forth above.

B. Illustrative Processes

Figure 8:
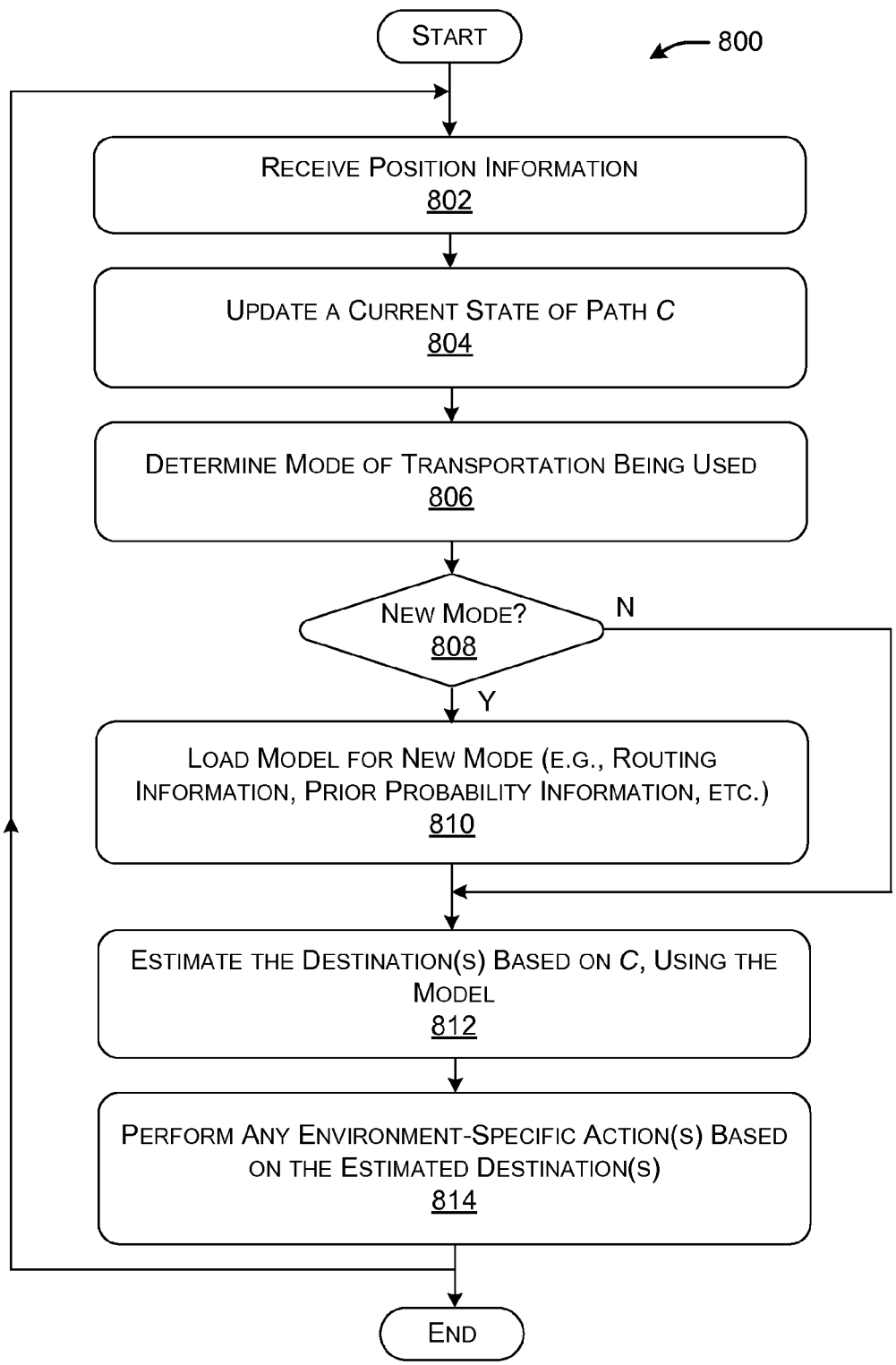
FIG. 8 is an illustrative flowchart that represents one manner of operation of the destination determination functionality of FIG. 1.

FIG. 8 shows a procedure 800 that explains one manner of operation of the destination determination functionality 100 of FIG. 1. Since the principles underlying the operation of the destination determination functionality 100 have already been described in Section A, certain operations will be addressed in summary fashion in this section.

In block 802, the path assessment module 110 receives position information from the position detection module 104. In block 804, the path assessment module 110 updates a current state of the path C based on the position information that is received in block 802. That is, if the position information indicates that the user has advanced to a new map location element (such as a new cell), then the path assessment module 110 adds a new cell index value to the end of a series of prior cell index values of the path C (if there are any such prior cell index values). In this example, the path C forms a temporally ordered list of indices defining the cells through which the user has passed.

In block 806, the transportation determination module 112 determines the mode of transportation 102 that is being used to traverse that path. The transportation determination module 112 can perform this classification task by comparing the spatial and temporal characteristics of the path with telltale patterns and/or sensor readings associated with different modes of transportation. In block 808, the transportation mode determination module 112 determines whether the mode detected in block 806 represents a newly encountered mode of transportation (that is, in the context of the course of the path). For example, assume that the user starts out on a trip by riding a bus. When the transportation determination module 112 recognizes this mode of transportation, block 808 will be answered in the affirmative, but thereafter in the negative. But assume that the user at some point departs the bus and continues his or her trip on foot. When the transportation determination module 112 recognizes this event, block 808 will again be answered in the affirmative.

In block 810, the configuration module 114 loads a model into the destination prediction module 116 associated with any newly encountered mode of transportation. As explained above, the model can include multiple components corresponding to different pieces of information that control the operation of the destination prediction module 116. Some components of the model influence the operation of the likelihood determination module 602, while other components influence the operation of the prior probability determination module 604.

In block 812, the destination prediction module 116 estimates a most likely destination (or destinations) of the user based on the partial path (specified in block 804) and based on the mode of transportation (specified in block 806). This determination can be performed using the Bayes rule expression set forth above.

In block 814, any application can use the results of block 812 in any way. For example, an application can provide driving suggestions to the user based on the estimated destination, etc.

C. Representative Computing Functionality

FIG. 9 sets forth illustrative computing functionality 900 that can be used to implement any aspect of the functions described above. For example, the computing functionality 900 can be used to implement any aspect of the destination determination functionality 100 of FIG. 1, e.g., as implemented in the embodiment of FIG. 5, or in some other embodiment. In one case, the computing functionality 900 may correspond to any type of computing device that includes one or more processing devices. In all cases, the electrical data computing functionality 900 represents one or more physical and tangible processing mechanisms.

The computing functionality 900 can include volatile and non-volatile memory, such as RAM 902 and ROM 904, as well as one or more processing devices 906 (e.g., one or more CPUs, and/or one or more GPUs, etc.). The computing functionality 900 also optionally includes various media devices 908, such as a hard disk module, an optical disk module, and so forth. The computing functionality 900 can perform various operations identified above when the processing device(s) 906 executes instructions that are maintained by memory (e.g., RAM 902, ROM 904, or elsewhere).

More generally, instructions and other information can be stored on any computer readable medium 910, including, but not limited to, static memory storage devices, magnetic storage devices, optical storage devices, and so on. The term computer readable medium also encompasses plural storage devices. In all cases, the computer readable medium 910 represents some form of physical and tangible entity.

The computing functionality 900 also includes an input/output module 912 for receiving various inputs (via input modules 914), and for providing various outputs (via output modules). One particular output mechanism may include a presentation module 916 and an associated graphical user interface (GUI) 918. The computing functionality 900 can also include one or more network interfaces 920 for exchanging data with other devices via one or more communication conduits 922. One or more communication buses 924 communicatively couple the above-described components together.

The communication conduit(s) 922 can be implemented in any manner, e.g., by a local area network, a wide area network (e.g., the Internet), etc., or any combination thereof. The communication conduit(s) 922 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, functionality described herein can employ various mechanisms to ensure the privacy of user data maintained by the functionality. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by at least one computer, for predicting at least one destination of a user, comprising:
    receiving position information at a particular time, describing a position of the user within a geographic area;
    updating, based on the position information, a current state of a path taken by the user within the geographic area; and
    estimating at least one destination of the user based on the path and a model, the model being associated with a determined mode of transportation that the user is using to traverse the path, the model being selected from among plural models associated with plural respective modes of transportation,
    said receiving, updating, and estimating being performed using said at least one computer,
    said at least one computer including at least one of (a) and/or (b), where (a) corresponds to one or more processing devices and (b) corresponds to one or more hardware logic components.

2. The method of claim 1, wherein the geographic area is discretized into a plurality of map location elements, and wherein the path is represented as a set of map location elements that are traversed by the path.

3. The method of claim 1, wherein a set of possible modes of transportation correspond to:
    at least one user-controlled vehicular mode of transportation;
    at least one public mode of transportation; and
    at least one pedestrian mode of transportation.

4. The method of claim 1, wherein said estimating uses Bayes rule to determine the destination of the user.

5. The method of claim 1, wherein the model that is loaded includes a likelihood component, the likelihood component providing information that enables the destination prediction module to determine a likelihood of the path given a particular candidate destination.

6. The method of claim 5, wherein the likelihood component includes routing network information, the routing network information describing routes within the geographic area that are available to the mode of transportation, together with costs associated with those routes.

7. The method of claim 6, wherein the costs in the routing network information have a cost type, and wherein the cost type is chosen based on the mode of transportation.

8. The method of claim 7, wherein the cost type is chosen from among:
    time of traversal;
    physical distance; and
    financial cost.

9. The method of claim 5, wherein the likelihood component includes an efficiency parameter that describes an efficiency at which users advance to destinations within the geographic area, wherein the efficiency parameter has a value that is chosen based on the mode of transportation.

10. The method of claim 1, wherein the model that is loaded includes at least one prior probability component, said at least one prior probability component describing prior probability information that enables the destination prediction module to determine whether a particular candidate destination represents an actual destination, independent of the influence of the path.

11. The method of claim 10, wherein said at least one prior probability component describes probabilities associated with trip durations within the geographic area, with respect to the mode of transportation.

12. The method of claim 10, wherein said at least one prior probability component describes probabilities based on points of interest within the geographic area, with respect to the mode of transportation.

13. The method of claim 10, wherein said at least one prior probability component describes probabilities based on previous destinations visited by the user, with respect to the mode of transportation.

14. The method of claim 10, wherein said at least one prior probability component describes probabilities for types of ground cover within the geographic area, with respect to the mode of transportation.

15. The method of claim 10, wherein the prior probability information imparted by said at least one prior probability component is qualified by at least one parameter, wherein said at least one parameter has a value which is chosen based on the mode of transportation.

16. The method of claim 1, wherein, if the determined mode of transportation is a newly encountered mode, loading the model associated with the determined mode of transportation into a destination prediction module, for use by said estimating.

17. At least one computer for predicting at least one destination, comprising:
   a path assessment module configured to identify a current state of a path C taken by a user within a geographic area, based on successive instances of position information that describe the path;
   a transportation mode determination module configured to determine a mode of transportation that a user is using to traverse the path C;
   a configuration module configured to make a model associated with the mode of transportation available for use in predicting destinations;
   a destination prediction module configured to estimate at least one destination of the user based on the path C and the model,
   the destination prediction module model estimating each destination based on $p(C|c^*)$ and $p(c^*)$,
   where $p(c^*|C)$ represents a probability that a particular candidate destination $c^*$ represents an actual destination of the user, given the path C,
   $p(C|c^*)$ represents a likelihood of the path C given the particular candidate destination $c^*$, where $p(C|c^*)$ is dependent on the mode of transportation,
   $p(c^*)$ represents a prior probability that the particular candidate destination $c^*$ represents the actual destination of the user, where $p(c^*)$ is dependent on the mode of transportation, and
   said at least one computer including at least one of (a) and/or (b), where (a) corresponds to one or more processing devices and (b) corresponds to one or more hardware logic components.

18. The destination analysis module of claim 17, wherein the model specifies routing network information for use in computing $p(C|c^*)$, the routing network information describing routes within the geographic area that are available to the mode of transportation, together with costs associated with those routes.

19. The destination analysis module of claim 17, wherein model specifies prior probability information for use in computing $p(c^*)$, the prior probability information describing one or more of:
   probabilities associated with trip durations within the geographic area, with respect to the mode of transportation,
   probabilities based on points of interest within the geographic area, with respect to the mode of transportation,
   probabilities based on previous destinations visited by the user, with respect to the mode of transportation, and
   probabilities for types of ground cover within the geographic area, with respect to the mode of transportation.

20. A physical and tangible computer readable storage medium device for storing computer readable instructions, the computer readable instructions implementing a method when executed by one or more processing devices, the method comprising:
   receiving position information at a particular time, describing a position of a user within a geographic area;
   updating, based on the position information, a current state of a path taken by the user within the geographic area;
   receiving a determination of a mode of transportation that the user is using to traverse the path, to provide a determined mode of transportation; and
   estimating at least one destination of the user based on the path and a model, the model being associated with the determined mode of transportation.

* * * * *